US011235181B2

(12) United States Patent
Daeffler et al.

(10) Patent No.: US 11,235,181 B2
(45) Date of Patent: Feb. 1, 2022

(54) BREATHABLE RESPIRATOR MASK WITH MULTIPLE LAYERED FILTERS

(71) Applicant: The Government of the United States of America, as represented by the Secretary of Homeland Security, Washington, DC (US)

(72) Inventors: Michael Daeffler, Salem, CT (US); Michael Plumley, New London, CT (US); Ronald Adrezin, East Lyme, CT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/096,561

(22) Filed: Nov. 12, 2020

(65) Prior Publication Data

US 2021/0379411 A1    Dec. 9, 2021

Related U.S. Application Data

(60) Provisional application No. 63/061,353, filed on Aug. 5, 2020, provisional application No. 63/035,198, filed on Jun. 5, 2020.

(51) Int. Cl.
*A62B 7/10* (2006.01)
*A62B 18/02* (2006.01)
(Continued)

(52) U.S. Cl.
CPC .............. *A62B 7/10* (2013.01); *A62B 18/025* (2013.01); *A62B 23/02* (2013.01); *A62B 9/06* (2013.01); *A62B 18/084* (2013.01)

(58) Field of Classification Search
CPC .... A62B 7/10; A62B 7/00; A62B 7/04; A62B 18/02; A62B 18/025; A62B 18/088;
(Continued)

(56) References Cited

U.S. PATENT DOCUMENTS 3,861,381 A * 1/1975 Witman ............ B29C 45/14336
                                                       128/206.12
4,141,703 A * 2/1979 Mulchi ................... A62B 23/02
                                                             96/132

(Continued)

OTHER PUBLICATIONS

Bgiovanny, COVID-19—GB 3D Mask System N95—PROTECT, Mar. 28, 2020, Thingiverse, whole document (Year: 2020).*

(Continued)

*Primary Examiner* — Joseph D. Boecker
*Assistant Examiner* — Brian T Khong
(74) *Attorney, Agent, or Firm* — Lavanya Ratnam; Kelly G. Hyndman; Robert W. Busby

(57) ABSTRACT

In an example, a respirator includes a respirator body having a distal portion and a proximal portion, the distal portion including a filter housing wall and an open distal end. The proximal portion includes a facial interface which is compliant and deformable from an undeformed state to a deformed state to conform to a facial contour of an individual. One or more filter frames are inserted into the distal portion and supported by the filter housing wall to separate filter media on opposite sides of at least one of the one or more filter frames. A filter cover is releasably attached to the open distal end to enclose the one or more filter frames and filter media, forming a filter housing. The one or more filter frames are removable from the distal portion and replaced into the distal portion to allow replacement of the filter media.

21 Claims, 20 Drawing Sheets

(51) Int. Cl.
*A62B 23/02* (2006.01)
*A62B 18/08* (2006.01)
*A62B 9/06* (2006.01)

(58) Field of Classification Search
CPC ....... A62B 18/084; A62B 23/00; A62B 23/02; A62B 23/025; A62B 23/06; A62B 9/02; A62B 9/04; A62B 9/06; A62B 9/006; A61M 16/0605; A61M 16/0683; A61M 2016/0661
See application file for complete search history.

(56) References Cited

U.S. PATENT DOCUMENTS

| | | | | |
|---|---|---|---|---|
| 4,155,358 | A * | 5/1979 | McAllister | A62B 18/088 128/202.22 |
| 4,630,604 | A * | 12/1986 | Montesi | A62B 18/025 128/206.15 |
| 4,688,567 | A * | 8/1987 | Kikuchi | A62B 23/02 128/206.15 |
| 4,821,340 | A | 4/1989 | Johnson | |
| 5,579,761 | A * | 12/1996 | Yuschak | A62B 23/02 128/206.17 |
| 6,112,746 | A * | 9/2000 | Kwok | A61M 16/0616 128/207.13 |
| 6,216,693 | B1 * | 4/2001 | Rekow | A62B 23/02 128/205.27 |
| RE39,493 | E | 2/2007 | Yuschak et al. | |
| 7,237,550 | B1 * | 7/2007 | Lin | A62B 18/025 128/205.27 |
| 9,393,448 | B2 | 7/2016 | Dwyer et al. | |
| 9,457,207 | B2 | 10/2016 | Waterford | |
| 10,004,866 | B2 | 6/2018 | Davis | |
| 10,143,864 | B2 | 12/2018 | Mittelstadt | |
| 10,569,044 | B2 | 2/2020 | Dunn et al. | |
| 10,646,731 | B2 | 5/2020 | Jayaraman et al. | |
| 2002/0005198 | A1 * | 1/2002 | Kwok | A61B 5/097 128/205.25 |
| 2003/0234016 | A1 * | 12/2003 | Swann | A62B 23/02 128/201.25 |
| 2004/0118406 | A1 * | 6/2004 | Lithgow | A61M 16/0622 128/206.24 |
| 2007/0006557 | A1 | 1/2007 | Wang et al. | |
| 2011/0232646 | A1 | 9/2011 | Ho et al. | |
| 2014/0041671 | A1 | 2/2014 | Kumar et al. | |
| 2014/0216479 | A1 | 8/2014 | Jeong | |
| 2015/0047642 | A1 * | 2/2015 | Tucker | A62B 18/025 128/206.17 |
| 2015/0099986 | A1 * | 4/2015 | Inoue | A62B 7/10 600/479 |
| 2015/0217518 | A1 | 8/2015 | Chun et al. | |
| 2015/0265794 | A1 | 9/2015 | De Kruyff et al. | |
| 2015/0314148 | A1 | 11/2015 | Waterford | |
| 2016/0213959 | A1 | 7/2016 | Barklow | |
| 2016/0361511 | A9 | 12/2016 | Karpas et al. | |
| 2017/0007861 | A1 * | 1/2017 | Parham | A62B 18/025 |
| 2017/0050057 | A1 * | 2/2017 | Sabolis | A62B 23/02 |
| 2017/0065838 | A1 * | 3/2017 | Bunge | A41D 13/1146 |
| 2017/0128753 | A1 | 5/2017 | Waterford | |
| 2017/0136270 | A1 | 5/2017 | Son et al. | |
| 2017/0173371 | A1 | 6/2017 | Truex et al. | |
| 2017/0209720 | A1 | 7/2017 | Mingo | |
| 2017/0274227 | A1 | 9/2017 | Fleming et al. | |
| 2018/0008848 | A1 * | 1/2018 | Moulton | A41D 13/1138 |
| 2018/0043122 | A1 | 2/2018 | Oenning | |
| 2018/0125715 | A1 | 5/2018 | Bellussi | |
| 2019/0336799 | A1 | 11/2019 | Montgomery et al. | |
| 2020/0061399 | A1 | 2/2020 | Wade | |
| 2020/0114178 | A1 | 4/2020 | Waterford et al. | |
| 2020/0129788 | A1 * | 4/2020 | Tu | A62B 18/025 |

OTHER PUBLICATIONS

Android08157, EUvsVirus—3D printed FFP-Mask, Apr. 25, 2020, Youtube, whole document (Year: 2020).*
Iczfirz, Flexible Mask Rolley [Universal Modular System] Covid-19, Apr. 12, 2020, Thingiverse, whole document (Year: 2020).*
Iafactoria3d, CO-VID19 Mask v2, Mar. 16, 2020, Thingiverse, whole document (Year: 2020).*
MrDWGraf, Makers Modular Mask System—Low Poly Covid-19 Face Mask Respirator—3D Printed for Corona Virus and other Applications, Apr. 2, 2020, Thingiverse, Whole Document (Year: 2020).*
Matthewinder, BolivAIR 3D Printable, Breathable, HEPA Respirator Mask, Mar. 27, 2020, Thingiverse, Whole Document (Year: 2020).*
National Institutes of Health 3D Print Exchange webpage: https://3dprint.nih.gov/collections/covid-19-response, [retrieved on Jul. 17, 2020].

* cited by examiner

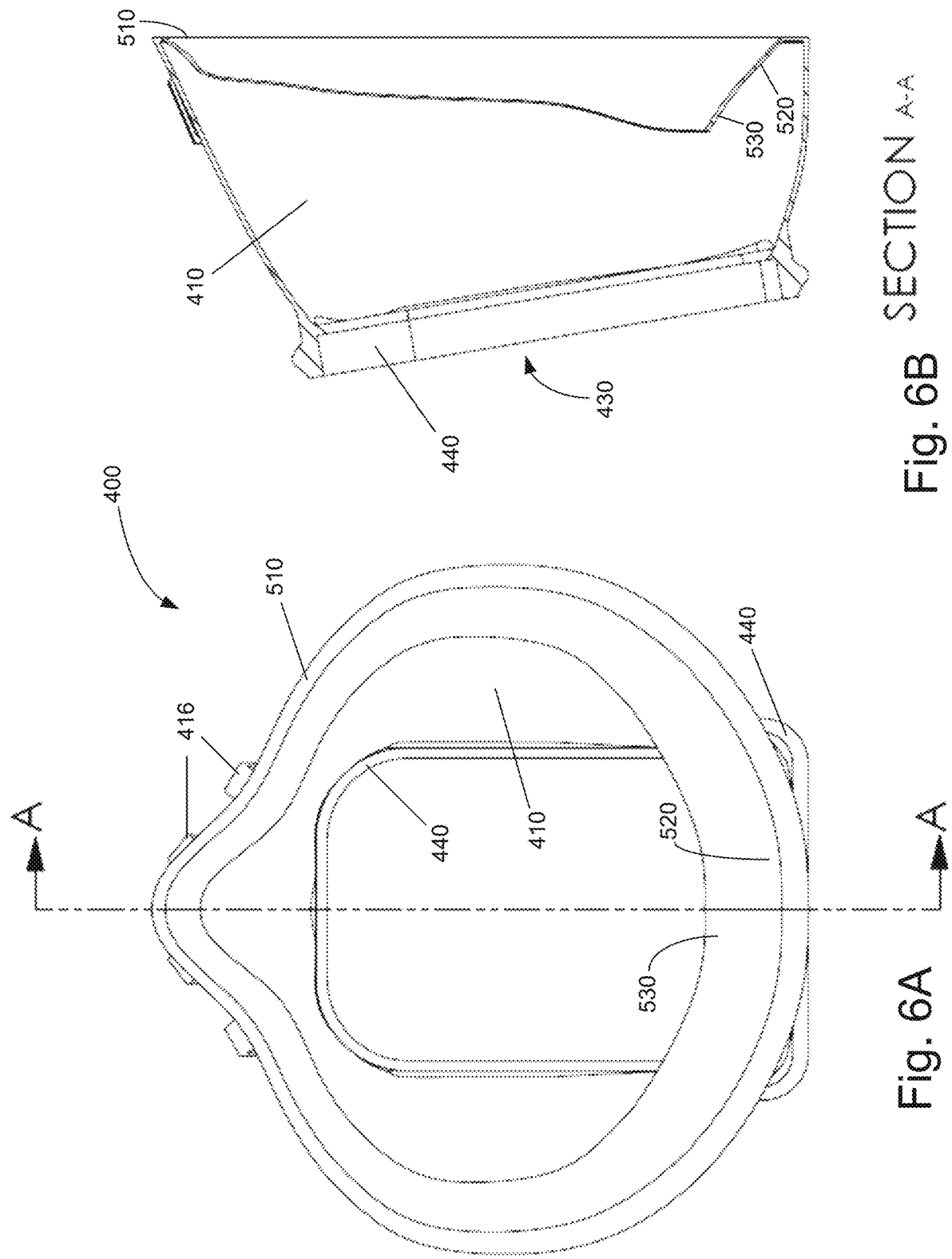

BREATHABLE RESPIRATOR MASK WITH MULTIPLE LAYERED FILTERS

CROSS-REFERENCE TO RELATED APPLICATIONS

The application claims the benefit of priority of U.S. Provisional Patent Application No. 63/035,198, filed on Jun. 5, 2020, entitled RESPIRATOR, and U.S. Provisional Patent Application No. 63/061,353, filed on Aug. 5, 2020, entitled RESPIRATOR, the entire disclosures of both of which are incorporated herein by this reference.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to respirators and, more particularly, to respirators that are 3D printable and have characteristics that can be adapted to meet N95 requirements.

BACKGROUND

N95 respirators and surgical masks (face masks) are examples of personal protective equipment that are used to protect the wearer from airborne particles and from liquid contaminating the face. An N95 respirator is a respiratory protective device designed to achieve a very close facial fit and very efficient filtration of airborne particles. The N95 designation means that when subjected to careful testing, the respirator blocks at least 95 percent of very small (0.3 micron) test particles. If properly fitted, the filtration capabilities of N95 respirators exceed those of face masks.

An N95 respirator is a respiratory protective device designed to achieve a very close facial fit and very efficient filtration of airborne particles. The facial interface of the respirator is designed to form a seal around the nose and mouth. Surgical N95 Respirators are commonly used in healthcare settings and are a subset of N95 Filtering Facepiece Respirators (FFRs), often referred to as N95s. Surgical masks and surgical N95s are similar in that they are tested for fluid resistance, filtration efficiency (particulate filtration efficiency and bacterial filtration efficiency), flammability, and biocompatibility, and that they should not be shared or reused.

A respirator may include cartridge(s), filter(s), and/or prefilter(s). Cartridges can trap gases and vapors. Filters can trap particles as well as gases and vapors. Prefilters typically trap particulates. For N95 applications, the cartridges, filters, and prefilters are certified by NIOSH (National Institute for Occupational Safety and Health). NIOSH rates filters on a scale of 3 efficiency levels. These are 95%, 99%, and 99.97%. Within these efficiency levels are 3 filter types. These are N, R, and P. This classification refers to how effective a filter works when exposed to oils:

| Filter type | Use |
| --- | --- |
| N filters | These are used when there are no oily particles. |
| R filters | These can be used to protect against oily particles. They are somewhat resistant to oils. |
| P filters | These can be used to protect against oily particles. They are fully resistant to oils. |

SUMMARY

Embodiments of the present invention are directed to respirators including 3D printable respirator components that may be configured for use as N95 respirators. The respirators can be produced economically and quickly. They are versatile and adaptable in use.

In specific embodiments, a 3D printable, flexible or hard-shell respirator makes use of various filter materials and can be reproduced with common desktop 3D printers to form usable respirators and/or make molds for other manufacturing processes. The respirators come in various sizes to accommodate different face shapes and sizes. They make use of available filtration material which may be available from other sources and locations. The respirators can be used with common mechanical filter media including N95 and N100 filter media. The respirators can be used as backup personal protective equipment; they may also be used in a primary setting. A modular filter housing on a distal side of the respirator provides modular filter compartments for receiving one or more types of filter media. A facepiece on a proximal side of the respirator provides an inner shell facial interface forming a contact footprint or a combined gasket to accommodate the respirator wearer's face.

In accordance with an aspect of the present invention, a respirator comprises: a respirator body having a distal portion and a proximal portion, the distal portion including a filter housing wall and an open distal end, the proximal portion including a facial interface which is compliant and deformable from an undeformed state to a deformed state to conform to a facial contour of an individual; one or more filter frames configured to be inserted into the distal portion and be supported by the filter housing wall to separate filter media on opposite sides of at least one of the one or more filter frames; and a filter cover configured to be releasably attached to the open distal end to enclose the one or more filter frames and filter media, forming a filter housing. The one or more filter frames are removable from the distal portion and replaced into the distal portion to allow replacement of the filter media.

In accordance with another aspect of the invention, a respirator comprising a respirator body having a distal portion and a proximal portion, the distal portion including a filter housing. The proximal portion includes a facial interface which is compliant and deformable from an undeformed state to a deformed state to conform to a facial contour of an individual. The respirator body includes an outer shell having a proximal end periphery. The facial interface includes an inner shell that extends from the proximal end periphery inwardly into an interior of the outer shell in a distal direction. The inner shell is compliant and deformable from the undeformed state to the deformed state to conform to the facial contour of the individual.

In accordance with another aspect of this invention, a respirator comprising: a respirator body having a distal portion and a proximal portion, the distal portion including a filter housing wall extending in a longitudinal direction to an open distal end to house one or more filter media, the proximal portion including a facial interface which is compliant and deformable from an undeformed state to a deformed state to conform to a facial contour of an individual. The respirator body includes an outer shell having a proximal end periphery. The outer shell is compliant and includes a first pair of left and right internal anchors in the interior of the outer shell, on left and right sides of the outer shell, distal of the proximal end periphery and proximal of the filter housing, to receive a first shaping link for adjusting a distance between the first pair of left and right internal anchors to shape the outer shell.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 6A is a rear elevational view of the respirator body of FIG. 4A.

FIG. 6B is a cross-sectional view of the respirator body of FIG. 6A.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figure 1:
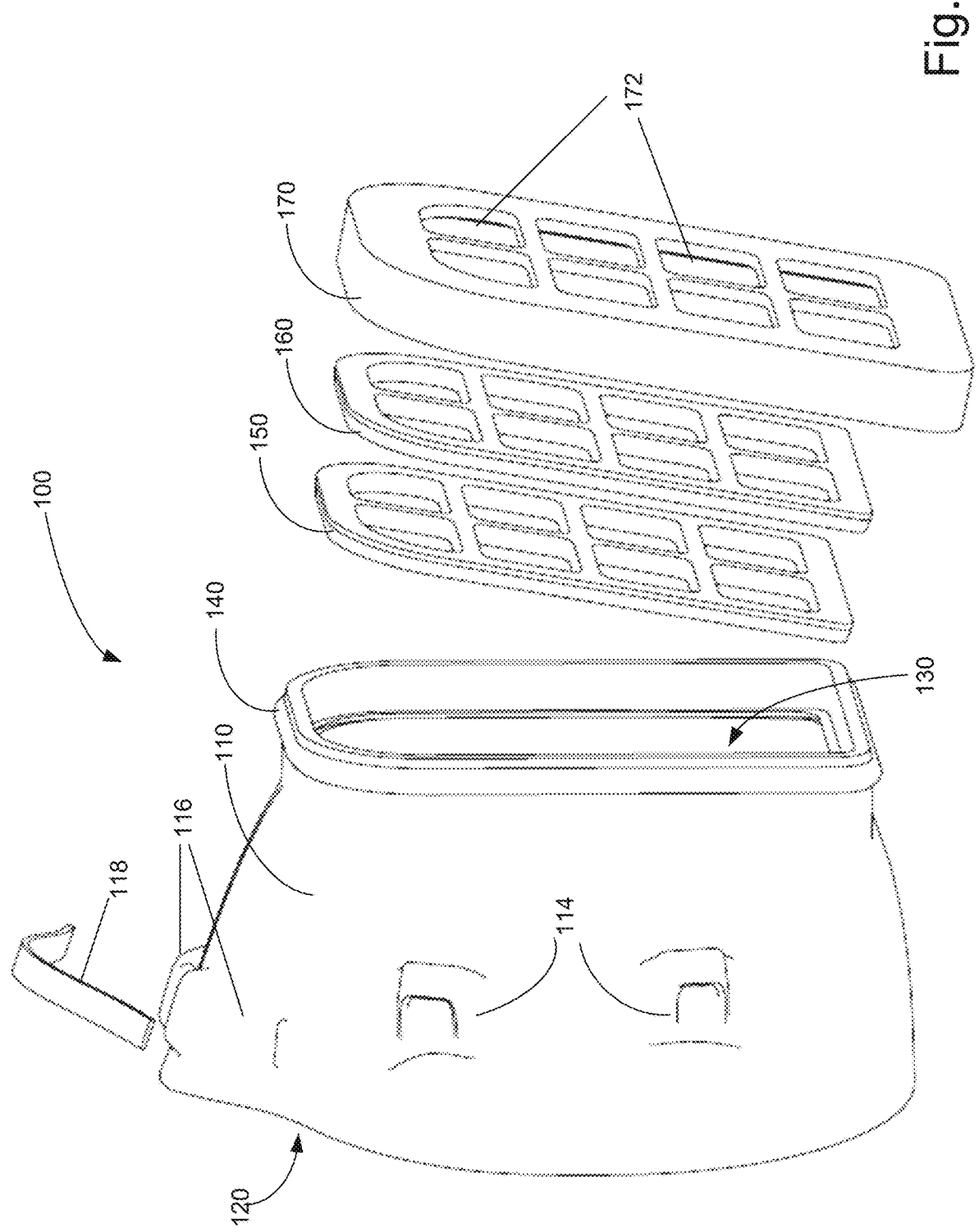
FIG. 1 shows an exploded front perspective view of a respirator according to an embodiment of the present invention.
Figure 2:
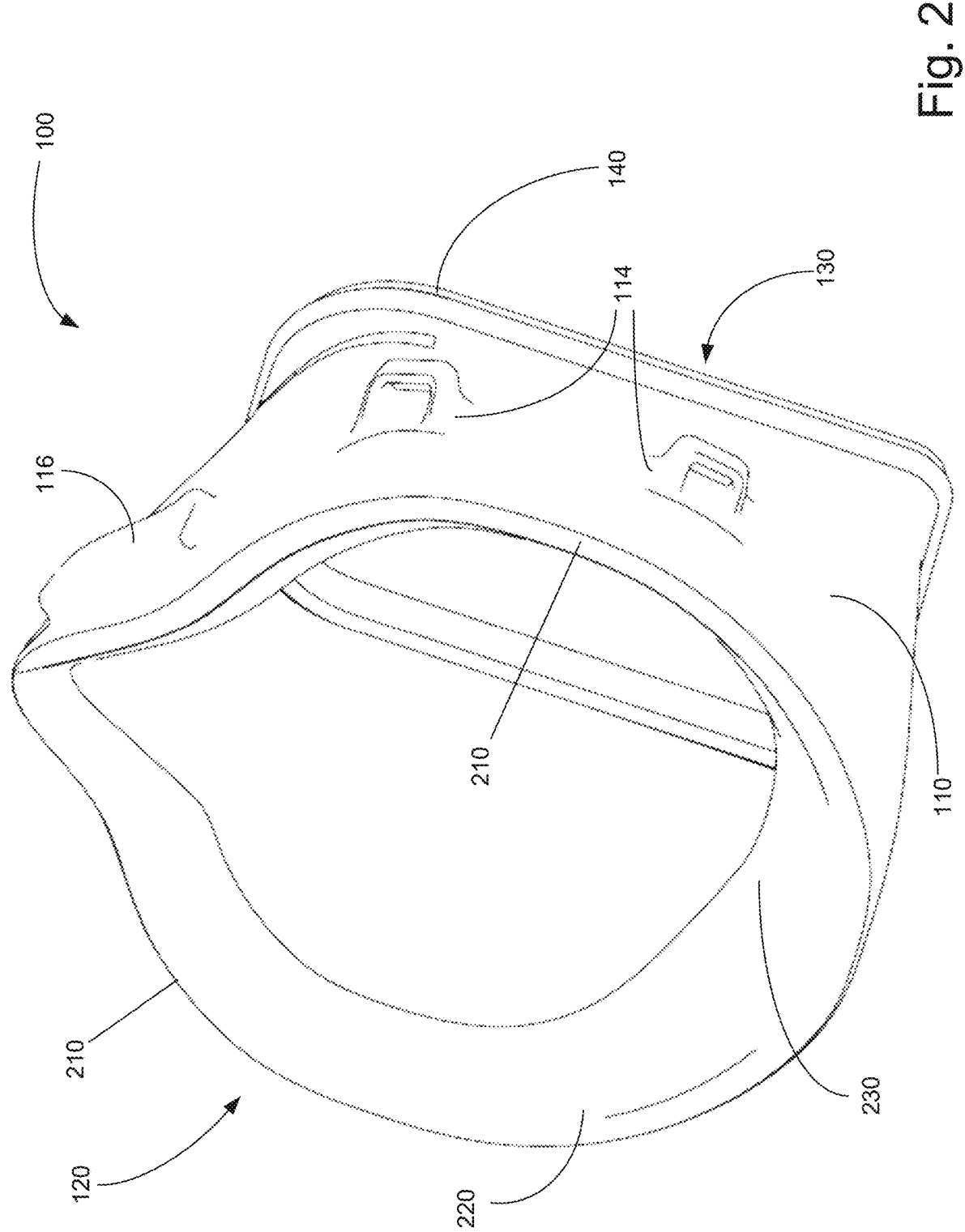
FIG. 2 illustrates a rear perspective view of a respirator body of the respirator of FIG. 1.

FIG. 1 shows an exploded front perspective view of a respirator according to an embodiment of the present invention. FIG. 2 illustrates a rear perspective view of a respirator body of the respirator of FIG. 1. The respirator includes a respirator body 100 which has an outer shell 110 with a pair of strap attachments or holders 114 on left and right sides for attaching mask straps and a pair of nose clip slots or retainer brackets 116 at the top for receiving a nose clip 118. The respirator body 100 has a back portion or proximal portion 120 on a proximal side of the body 110 and a front portion or distal portion 130 on a distal side of the body 110. The distal portion 130 includes a filter housing wall 140 and an open distal end. The distal portion 130 provides a filter box or housing and the proximal portion 120 provides a facepiece.

Filter Housing with Modular Filter Compartments

As shown in FIG. 1, the respirator has a compliant mechanism of securing filter media to the distal side of the respirator body 100, with the ability to add one or more filters on top of each, that would also provide for pre and post filtering to accommodate filtration needs as well as protection from dust, user's exhaled breath, and blood splatter protection (which would make it suitable for surgical as well as non-surgical work, an important respirator distinction).

One or more filter frames are configured to be inserted into the distal portion 130 and be supported by the filter housing wall 140 to separate filter media on opposite sides of each filter frame. FIG. 1 shows a first filter frame 150 and a second filter frame 160. The filter housing wall 140 extends from the outer shell 110 to an open distal end at the distal portion 130. A filter cover 170 is configured to be releasably attached to the open distal end of the respirator body 100 to enclose the filter frames 150, 160 and filter media, forming a filter housing. The filter frames 150, 160 and filter cover 170 each have openings 172 formed by transverse beams or cross beams. The openings of the frames 150, 160 and cover 170 may be aligned in a longitudinal direction extending between the proximal side and the distal side, as seen in FIG. 1. The filter frames 150, 160 are removable from the filter housing at the distal portion 130 and replaced into the filter housing to allow replacement of the filter media via the open distal end. The filter housing removably secures a plurality of removable filter media.

The plurality of filter frames are disposed in the filter housing to provide a plurality of modular filter compartments to place one or more types of filter media, including multiple different types in multiple compartments. In the embodiment of FIG. 1, the filter housing wall 140 has a cylindrical interior surface in the longitudinal direction (310 in FIG. 3B) and the filter frames 150, 160 have the same lateral shape conforming to the cylindrical interior of the filter housing wall 140 and approximately the same lateral dimensions transverse to (e.g., perpendicular to) the longitudinal direction. In some embodiments, the lateral dimensions of the filter frames 150, 160 are smaller than the lateral dimensions of the interior of the filter housing wall 140, sufficiently to allow the filter frames 150, 160 to be easily slid into and out of the interior of the filter housing wall 140. In other embodiments, the lateral dimensions of the filter frames 150, 160 may be only slightly smaller than the lateral dimensions of the interior of the filter housing wall 140 to provide a friction fit between the filter frames 150, 160 and the interior of the filter housing wall 140. The filter frames 150, 160 can be slid into and out of the interior of the filter housing wall 140 with the ability to maintain their positions by the friction fit.

The filter box or housing is provided on the distal side of the respiratory body 110. In the embodiment shown in FIG. 1, the filter housing can accommodate first inner filter media behind the first filter frame 150, second inner filter media between the first filter frame 150 and the second filter frame 160, and third inner filter media between the second filter frame 160 and the filter cover 170. One or more external filter media can be added in front of the filter cover 170. In addition, more inner filter media can be accommodated by adding, in a modular manner, more filter frames to provide additional modular filter compartments inside the filter housing.

The filter media may include custom filter materials, commercially available filter materials such as HVAC or furnace filters, or readily available household filter materials such as coffee filters. For the purpose of this disclosure, filter media is a term that encompasses cartridges, filters, prefilters, N filters, R filters, P filters, active carbon filter inserts, custom filters, commercially available filters such as HVAC or furnace filters, household filters such as coffee filters, and other filter materials.

Facepiece Having Inner Shell Facial Interface

Figure 3A:
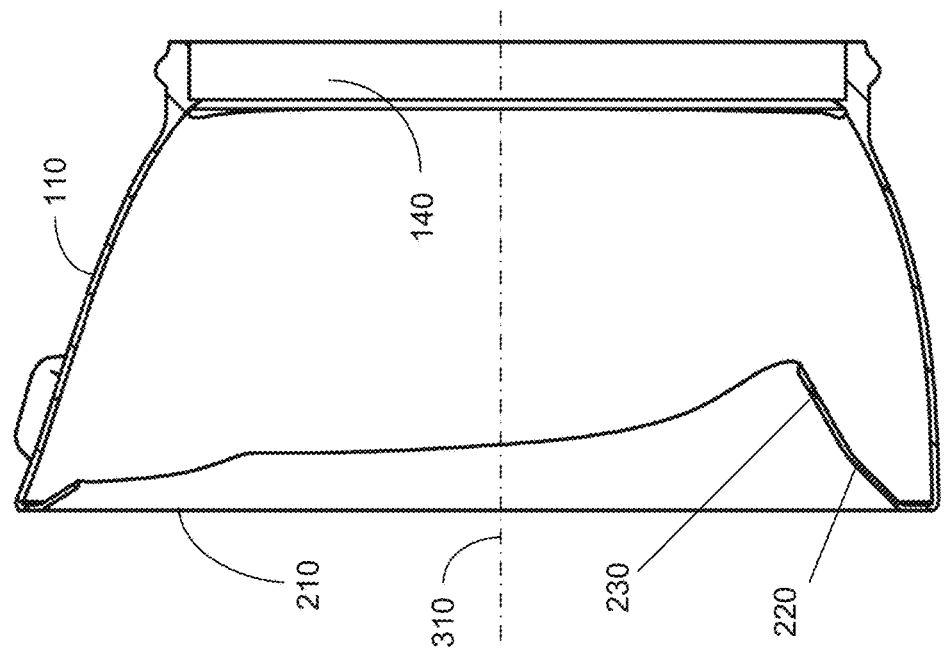
FIG. 3A illustrates a cutaway rear perspective view of the respirator body of FIG. 2.
Figure 3B:
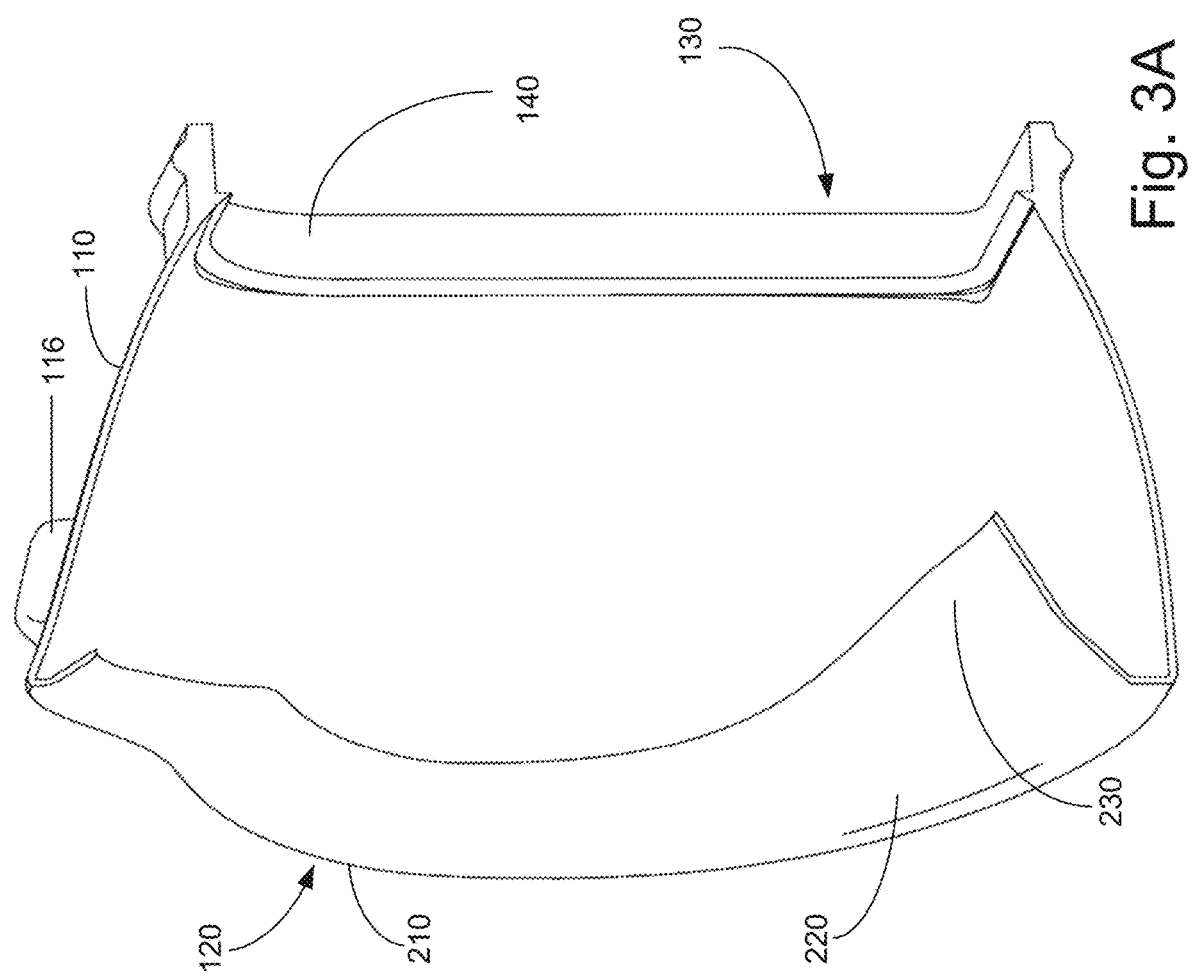
FIG. 3B illustrates a cutaway elevational view of the respirator body of FIG. 3A.

FIG. 3A illustrates a cutaway rear perspective view of the respirator body of FIG. 2. FIG. 3B illustrates a cutaway elevational view of the respirator body of FIG. 3A. As seen in FIGS. 2, 3A, and 3B, the proximal portion 120 of the respirator body 100 provides a facepiece having a facial interface which is compliant and deformable from an undeformed state to a deformed state to conform to a facial contour of an individual. Typically, the facial interface is a sealing interface configured to fit over at least the nose and mouth of the individual. The sealing interface is adapted to substantially seal around the facial contours of the individual providing a sealed fluid communication to the respiratory tract of the individual.

The outer shell 110 of the respirator body 100 includes a proximal end periphery 210. The facial interface includes an inner contoured shell 220, 230 that extends from the proximal end periphery 210 inwardly into an interior of the outer shell in a distal direction. The inner contoured shell is compliant and deformable from the undeformed state to the deformed state to conform to the facial contour of the individual. The outer shell forming the respirator body 100 may be a flexible shell or a hard shell. The inner contoured shell 220, 230 is a flexible shell and may have inner shell material and/or thickness, which are different from outer shell material and/or thickness of the outer shell and which render the inner shell more compliant than the outer shell (i.e., thinner shell or more flexible material or both).

In the embodiment shown in FIG. 2, the inner shell has a first portion 220 that extends from the nasal bone (e.g., between the eyes of the individual) at the top to a region of the face at or below the chin at the bottom, and a second portion 230 which is a lower portion to contact at least a part of the chin. In FIGS. 1-3B, the inner shell is a form-fitting shell contoured and deformable to form a seal over the facial contour of the individual to cover the individual's nose, mouth, and chin. The second portion 230 may be configured to intimately contact the jaw line of the individual. As best seen in FIG. 3B, the proximal end periphery 210 lies on a vertical plane, the first portion 220 at the bottom is disposed at an angle of about 55° from the vertical plane (which may range from about 45° to about 65°), and the second portion 230 at the bottom is disposed at an angle of about 30° from the vertical plane (which may range from about 20° to about 40°). As such, the first portion 220 extends from the proximal end periphery 210 inwardly into the interior of the outer shell 110 in the distal direction and the second portion 230 extends from the first portion 220 inwardly into the interior of the outer shell in the distal direction, the second portion 230 being shallower in contour with respect to the distal direction than the first portion 220.

The upper part of the inner shell is generally triangular in shape to cover the nose and extends to the nasal bone, for example, intimately contacting the dorsum nasi and cheekbone. The nose clip 118 can be inserted into the pair of nose clip slots 116 and used to pinch the top of the inner shell to form a better seal above the nose.

In different embodiments, the inner shell may have fewer or more than two portions to create different sealed contact footprints to cover different parts of the individual's face. For example, the lower portion of the contact footprint may extend only to the portion of the face between the lower lip and the mental protuberance (hence not covering the chin). In some embodiments, the facial interface is custom made based upon a facial feature of an individual (e.g., by mapping the facial feature and using a manufacturing process such as 3D printing to accommodate the mapped facial feature).

Figure 4A:
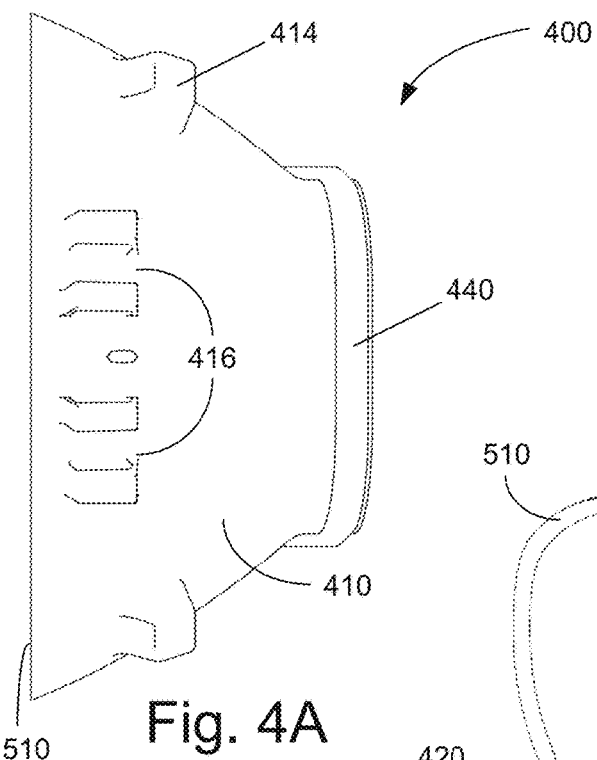
FIG. 4A is a top view of a respirator body according to another embodiment of the invention.
Figure 4B:
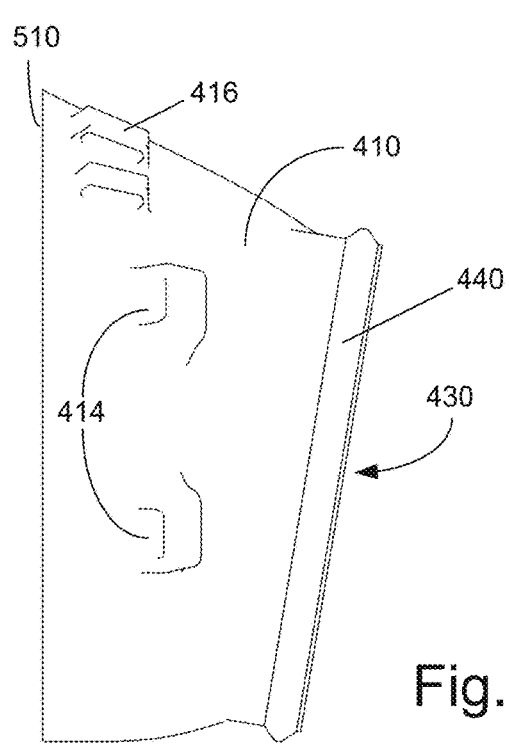
FIG. 4B is a side elevational view of the respirator body of FIG. 4A.
Figure 4C:
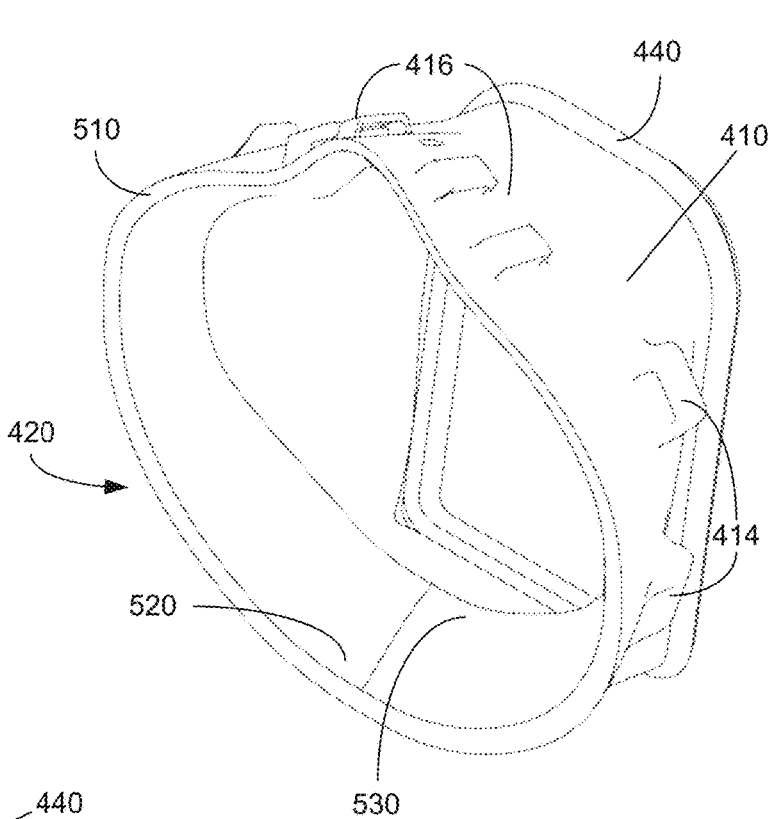
FIG. 4C is a perspective view of the respirator body of FIG. 4A.
Figure 5:
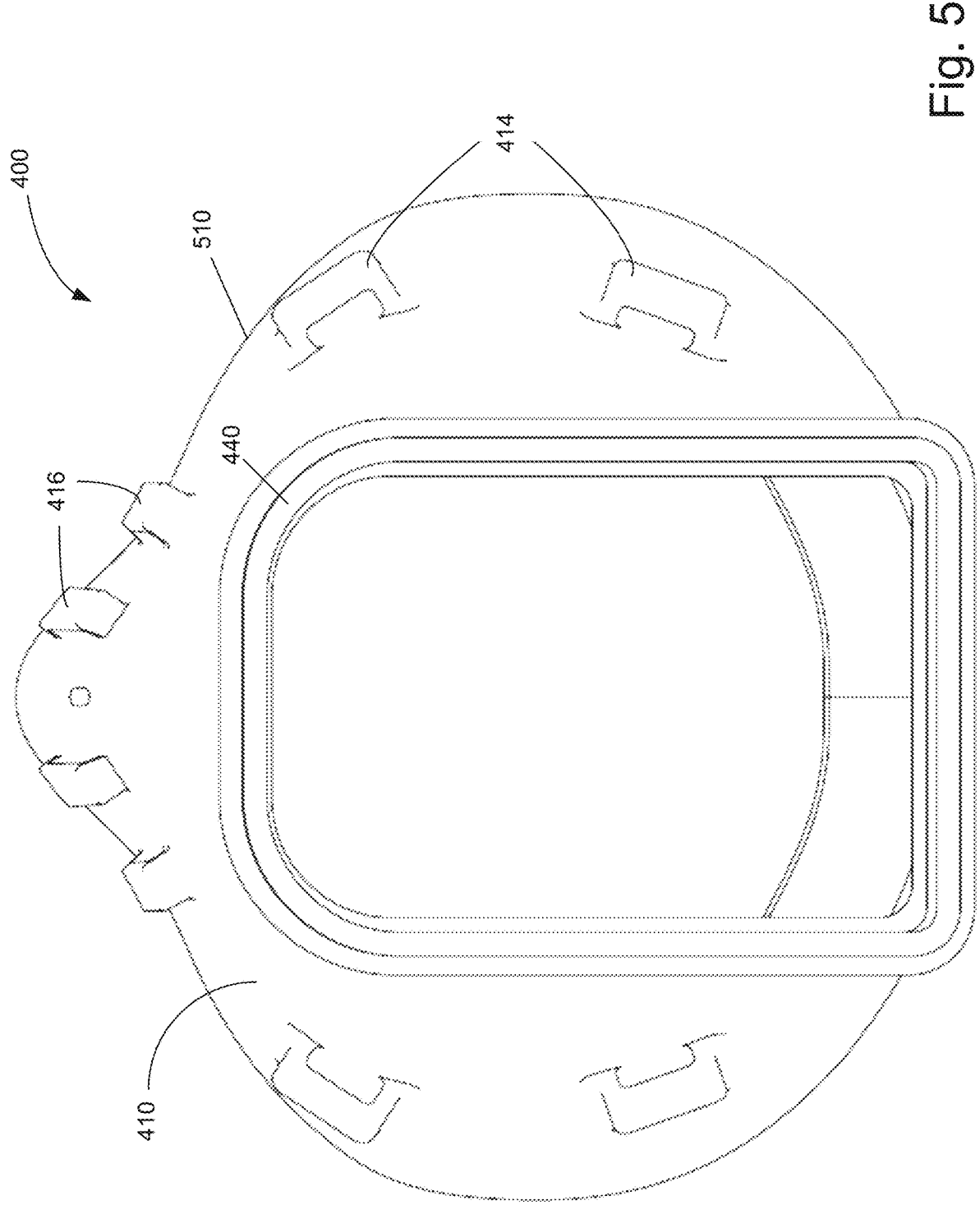
FIG. 5 is a front elevational view of the respirator body of FIG. 4A.

FIG. 4A is a top view of a respirator body according to another embodiment of the invention. FIG. 4B is a side elevational view of the respirator body of FIG. 4A. FIG. 4C is a perspective view of the respirator body of FIG. 4A. FIG. 5 is a front elevational view of the respirator body of FIG. 4A. FIG. 6A is a rear elevational view of the respirator body of FIG. 4A. FIG. 6B is a cross-sectional view of the respirator body of FIG. 6A.

The respirator body 400 has an outer shell 410 with a pair of strap attachments or holders 414 on left and right sides for attaching mask straps and a set of nose clip slots or retainer brackets 416 at the top for receiving a nose clip. The respirator body 400 has a back portion or proximal portion 420 on a proximal side of the body 410 and a front portion or distal portion 430 on a distal side of the body 410. The distal portion 430 includes a filter housing wall 440 and an open distal end. The distal portion 430 provides a filter box or housing and the proximal portion 420 provides a facepiece. The filter housing wall 440 at the distal portion 430 of the respirator body 400 is at a downward angle which provides slightly better visibility. The flat distal end of the filter hosing wall 440 at the distal portion 430 of the respirator body 400 is at an angle of about 2 to about 20 degrees with respect to the flat proximal end at the proximal portion 420 (the angle is about 10 degrees in FIG. 4B).

The outer shell 410 of the respirator body 400 includes a proximal end periphery 510. The facial interface includes an inner contoured shell 520, 530 that extends from the proximal end periphery 510 inwardly into an interior of the outer shell in a distal direction. The inner contoured shell is compliant and deformable from the undeformed state to the deformed state to conform to the facial contour of the individual. The inner shell facial interface 520, 530 forms a contact footprint or a combined gasket on the inner back to accommodate the respirator wearer's face. As seen in FIG. 6B, the inner shell or gasket (520, 530) has a smoother transition from the first portion 520 to the second portion 530 which makes the facepiece more flexible to conform around the face (as opposed to a sharper edge at the more delineated transition of the inner shell 220, 230 of FIGS. 3A and 3B). As such, the first portion 520 extends from the proximal end periphery 510 inwardly into the interior of the outer shell 410 in the distal direction and the second portion 530 extends from the first portion 520 inwardly into the interior of the outer shell in the distal direction with a smoother transition, the second portion 530 being shallower in contour with respect to the distal direction than the first portion 520.

Figure 7B:
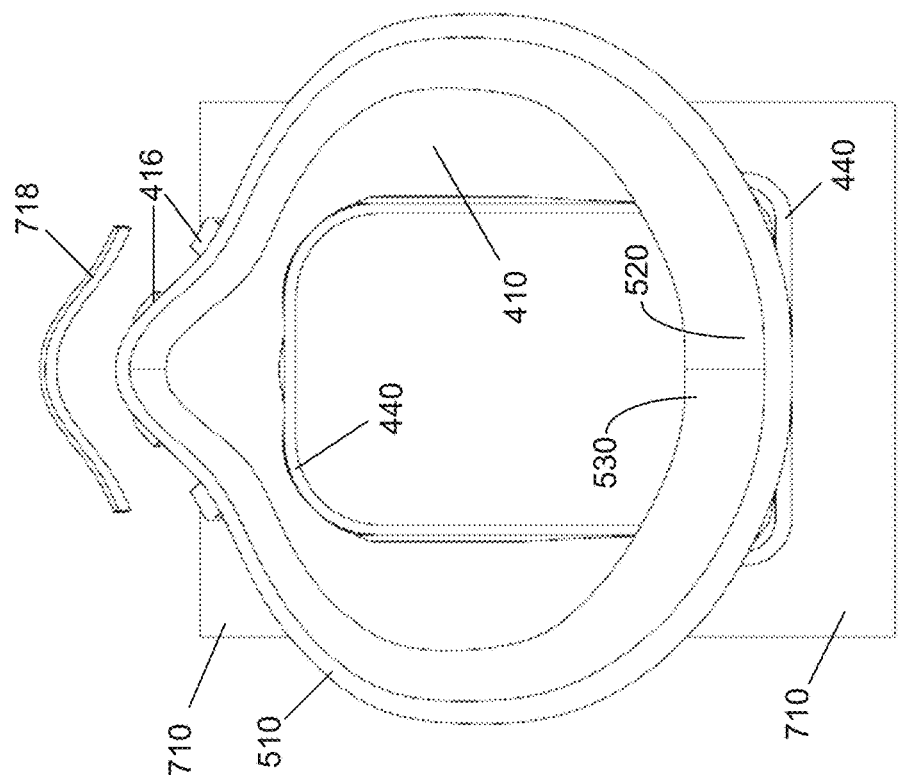
FIG. 7B is rear elevational view of the respirator body of FIG. 7A.
Figure 7A:
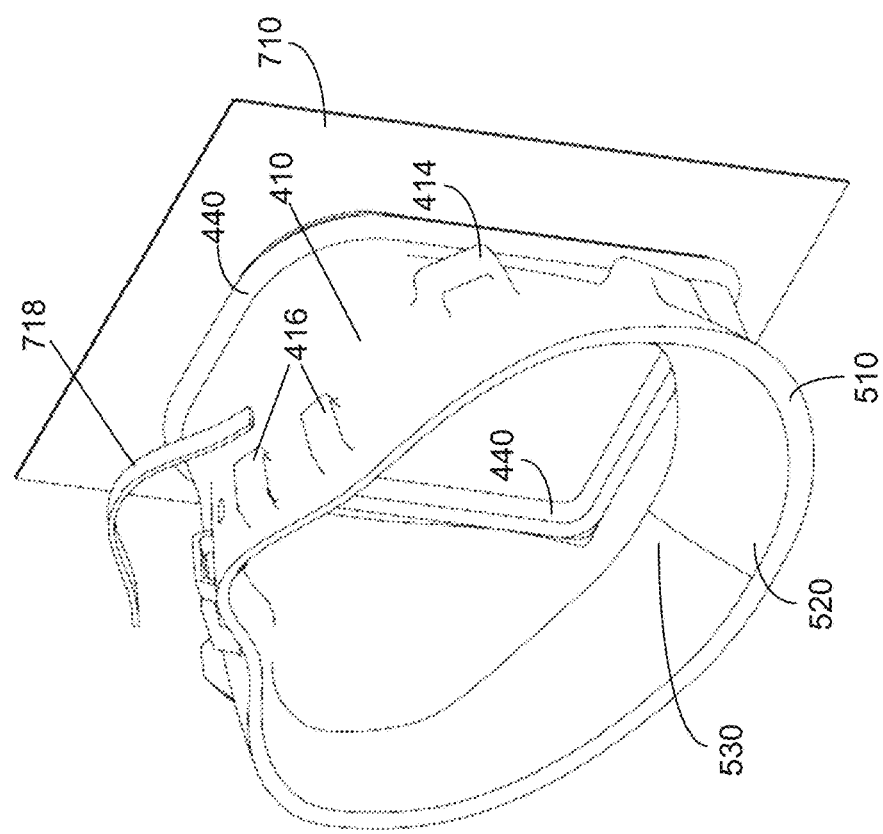
FIG. 7A is a perspective view of the respirator body of FIG. 4A with a nose clip and a filter.

FIG. 7A is a perspective view of the respirator body 400 of FIG. 4A with a nose clip and a filter. FIG. 7B is rear elevational view of the respirator body of FIG. 7A. The upper part of the inner shell (520, 530) is generally triangular in shape to cover the nose and extends to the nasal bone. A nose clip 718 inserted into the set of nose clip slots 416 can be used to pinch the top of the inner shell to form a better seal above the nose. In this embodiment, the set of nose clip slots 416 have four sections instead of two (in FIGS. 1 and 2) to allow for more flexibility around the nose. A filter 710 is shown at the distal end of the filter housing wall 440.

Figure 8A:
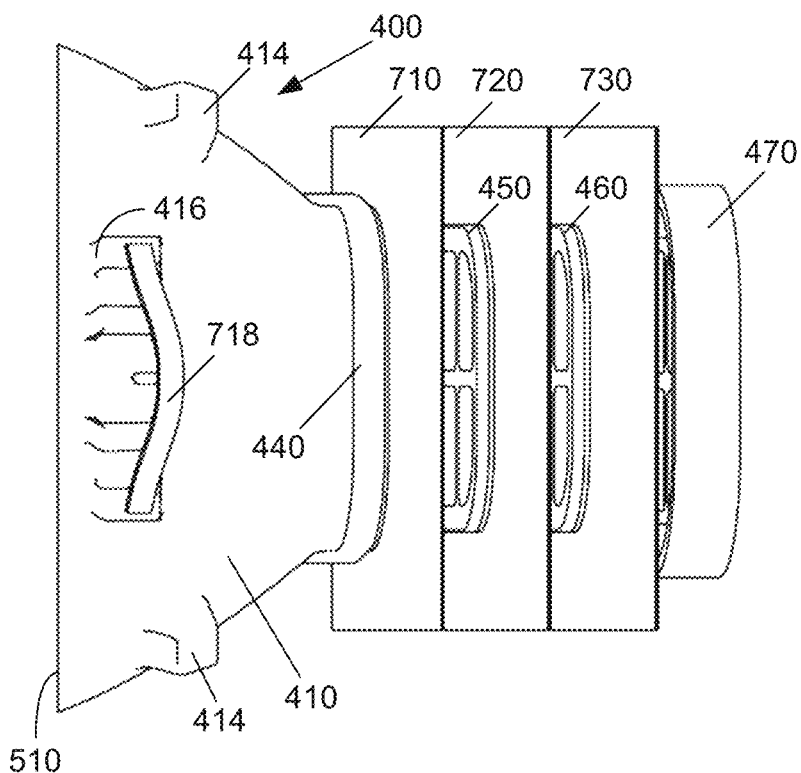
FIG. 8A is a top view of a respirator having the respirator body of FIG. 4A.
Figure 8B:
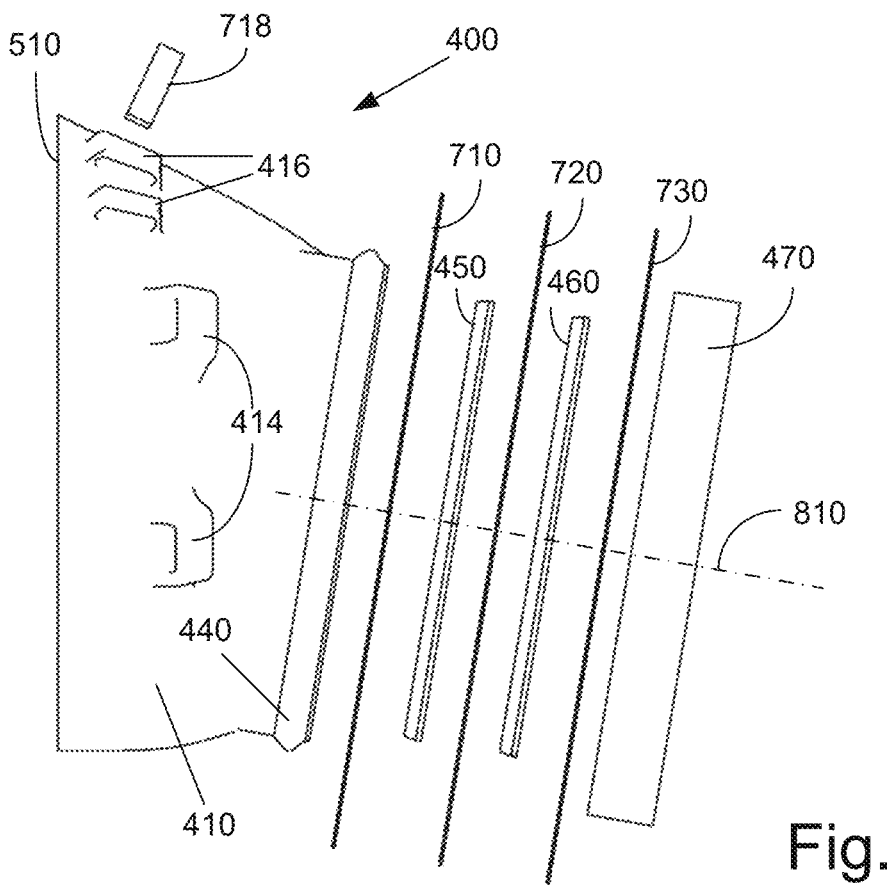
FIG. 8B is a side elevational view of the respirator of FIG. 8A.
Figure 9B:
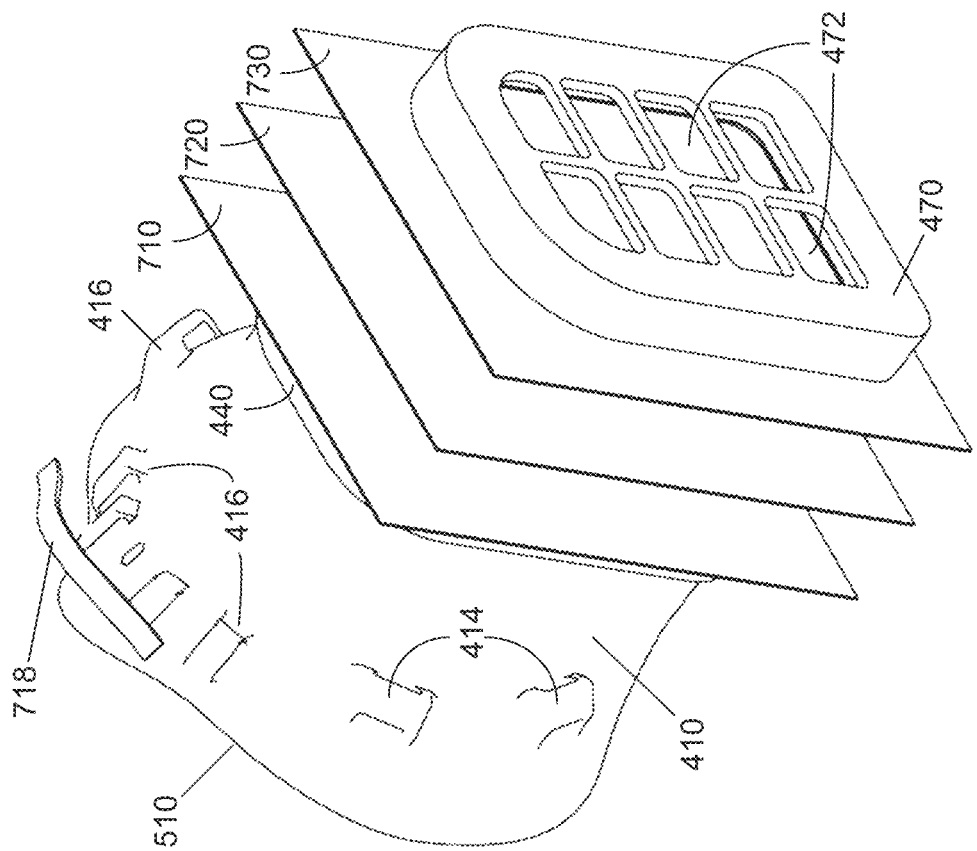
FIG. 9B is a front perspective view of the respirator of FIG. 8A.
Figure 9A:
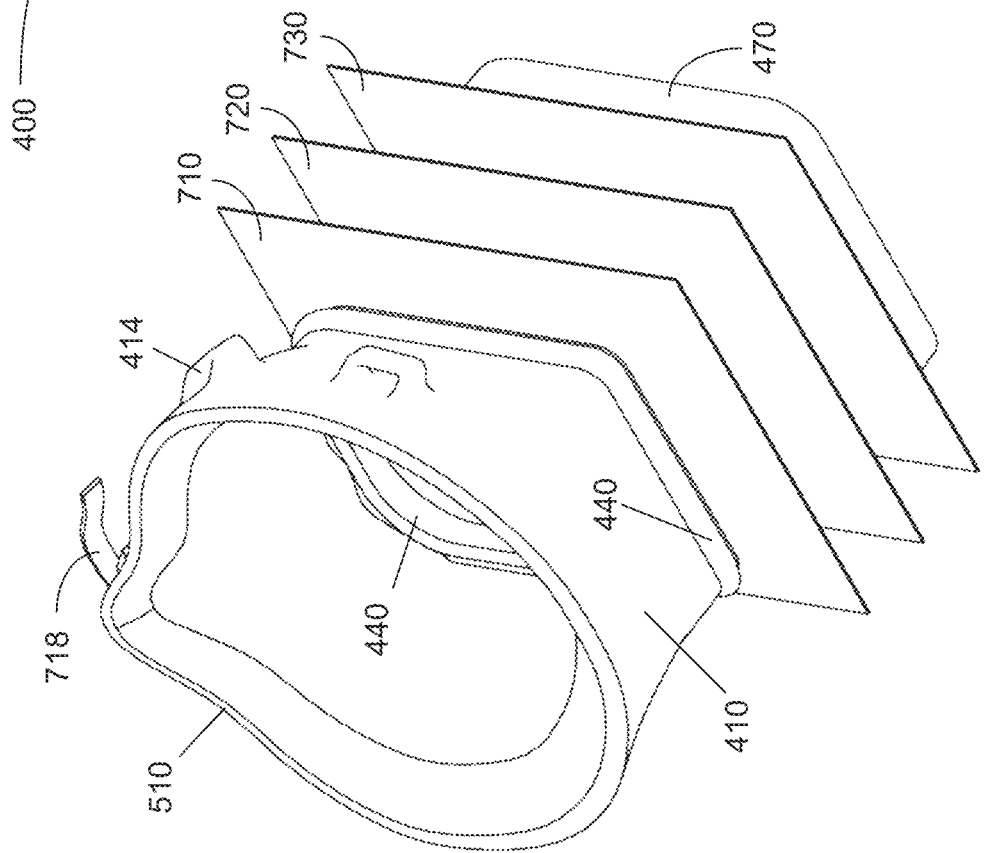
FIG. 9A is a rear perspective view of the respirator of FIG. 8A.

FIG. 8A is a top view of a respirator having the respirator body 400 of FIG. 4A. FIG. 8B is a side elevational view of the respirator of FIG. 8A. FIG. 9A is a rear perspective view of the respirator of FIG. 8A. FIG. 9B is a front perspective view of the respirator of FIG. 8A.

One or more filter frames are configured to be inserted into the distal portion 430 and be supported by the filter housing wall 440 to separate filter media on opposite sides of each filter frame. FIGS. 8A-9B show a first filter frame 450 and a second filter frame 460. A filter cover 470 is configured to be releasably attached to the open distal end of the respirator body 400 to enclose the filter frames 450, 460 and filter media, forming a filter housing. The filter frames 450, 460 and filter cover 470 each have openings 472 formed by transverse beams or cross beams. The openings of the frames and cover may be aligned in the longitudinal direction 810 extending between the proximal side and the distal side. The filter frames 450, 460 are removable from the filter housing at the distal portion 430 and replaced into the filter housing to allow replacement of the filter media. The filter housing removably secures a plurality of removable filter media. The plurality of filter frames are disposed in the filter housing to provide a plurality of modular filter compartments to place one or more types of filter media.

The filter box or housing is provided on the distal side of the respiratory body 410. In the embodiment shown in FIGS. 8A-9B, the filter housing can accommodate first inner filter media 710 behind the first filter frame 450, second inner filter media 720 between the first filter frame 450 and the second filter frame 460, and third inner filter media 730 between the second filter frame 460 and the filter cover 470. One or more external filter media can be added in front of the filter cover 470. In addition, more inner filter media can be accommodated by adding more filter frames inside the filter housing to provide additional modular filter compartments. The edges of the filter media 710, 720, 730 may be trimmed to more closely match the size and shape of the filter housing.

Figure 10:
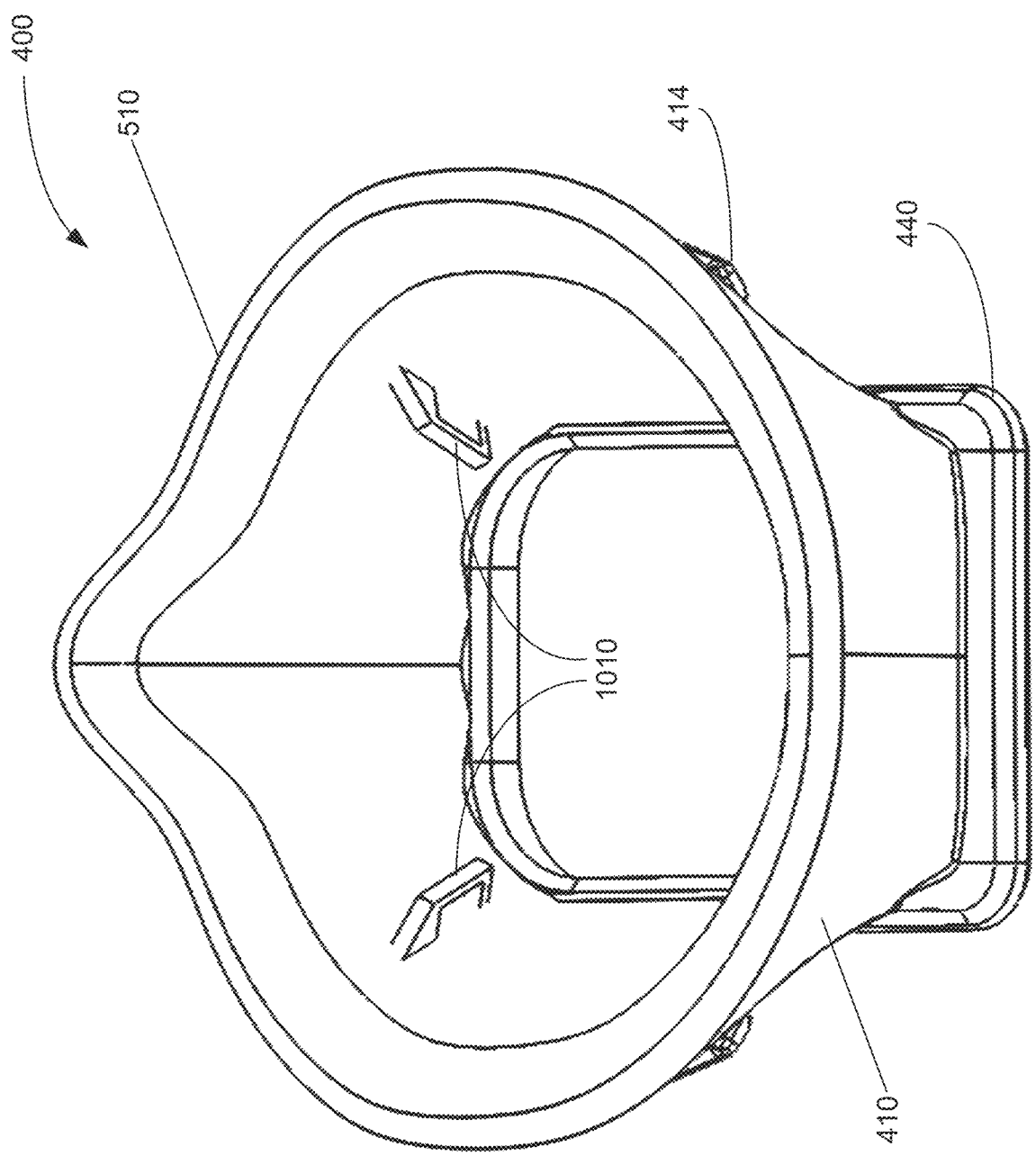
FIG. 10 illustrates a rear perspective view of a respirator body of the respirator according to another embodiment.
Figure 11:
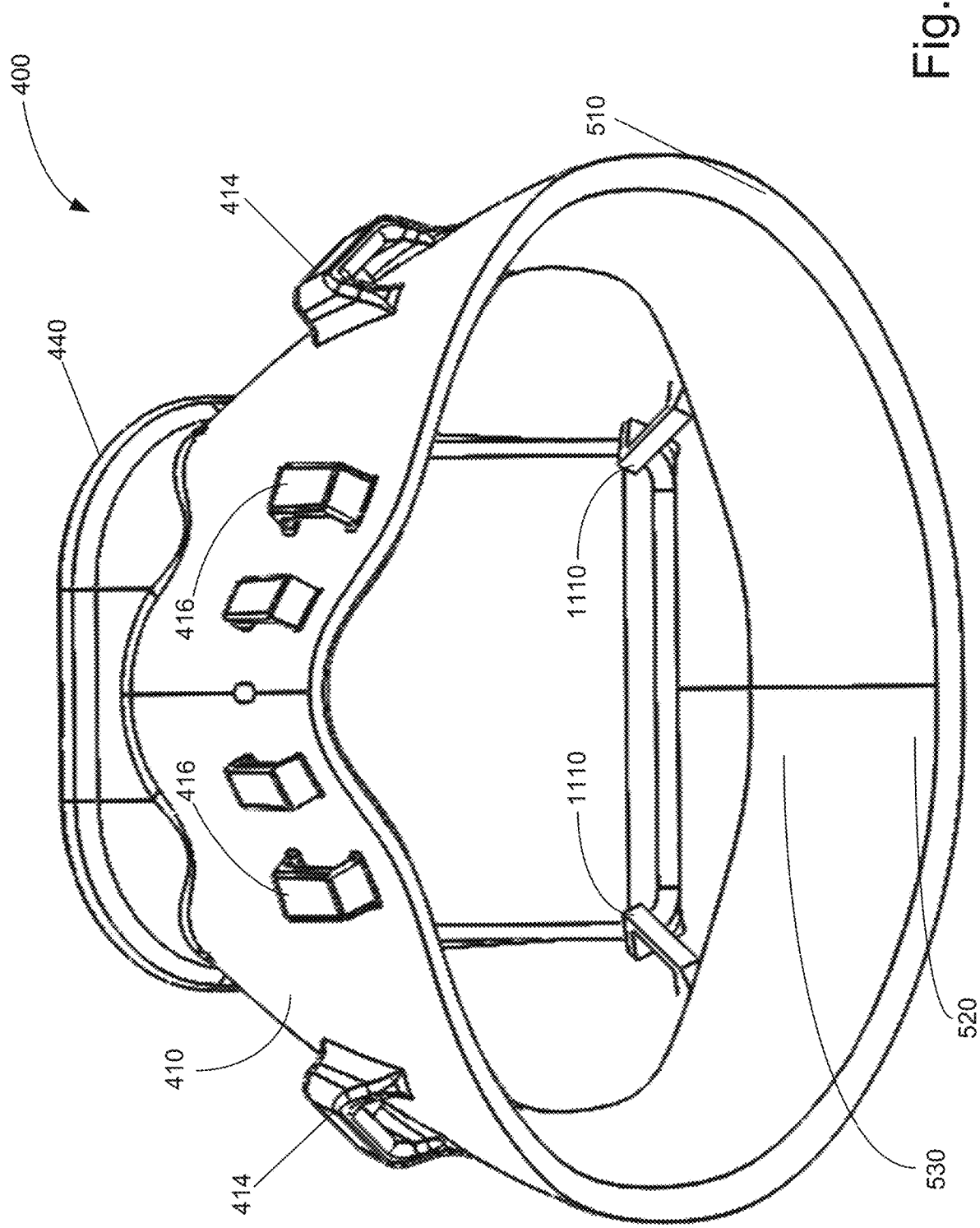
FIG. 11 illustrates another rear perspective view of the respirator body of the respirator of FIG. 10.

FIG. 10 illustrates a rear perspective view of a respirator body of the respirator according to another embodiment. FIG. 11 illustrates another rear perspective view of the respirator body of the respirator of FIG. 10. The respirator body 400 is similar to that shown in FIGS. 4-6 with the addition of internal anchors for shaping (reshaping or preshaping) the respirator body 400 to provide a better fit for the wearer's face.

A pair of left and right upper internal anchors 1010 (e.g., loops, catches, openings, etc.) are disposed on left and right sides of the respirator body in the interior of the outer shell 410, below the triangular upper part for the nose, distal of the proximal end periphery 510 and the inner shell 520, 530, and proximal of the filter housing wall 440, to allow an upper shaping tie or link (e.g., string, cable, wire, etc.) to be connected to the left and right upper internal anchors 1010 to pull them toward one another to shape the upper part of the outer shell 410. A pair of left and right lower internal anchors 1110 are disposed on the left and right sides of the outer shell 410, below the pair of upper internal anchors 1010, distal of the proximal end periphery 510 and the inner shell 520, 530, and proximal of the filter housing wall 440, to allow a lower shaping link to be connected to the left and right lower internal anchors 1110 and pull them toward one another to shape the lower part of the outer shell 410. Alternatively, one shaping link may pass through all four internal anchors to shape or preshape the respirator.

Figure 12:
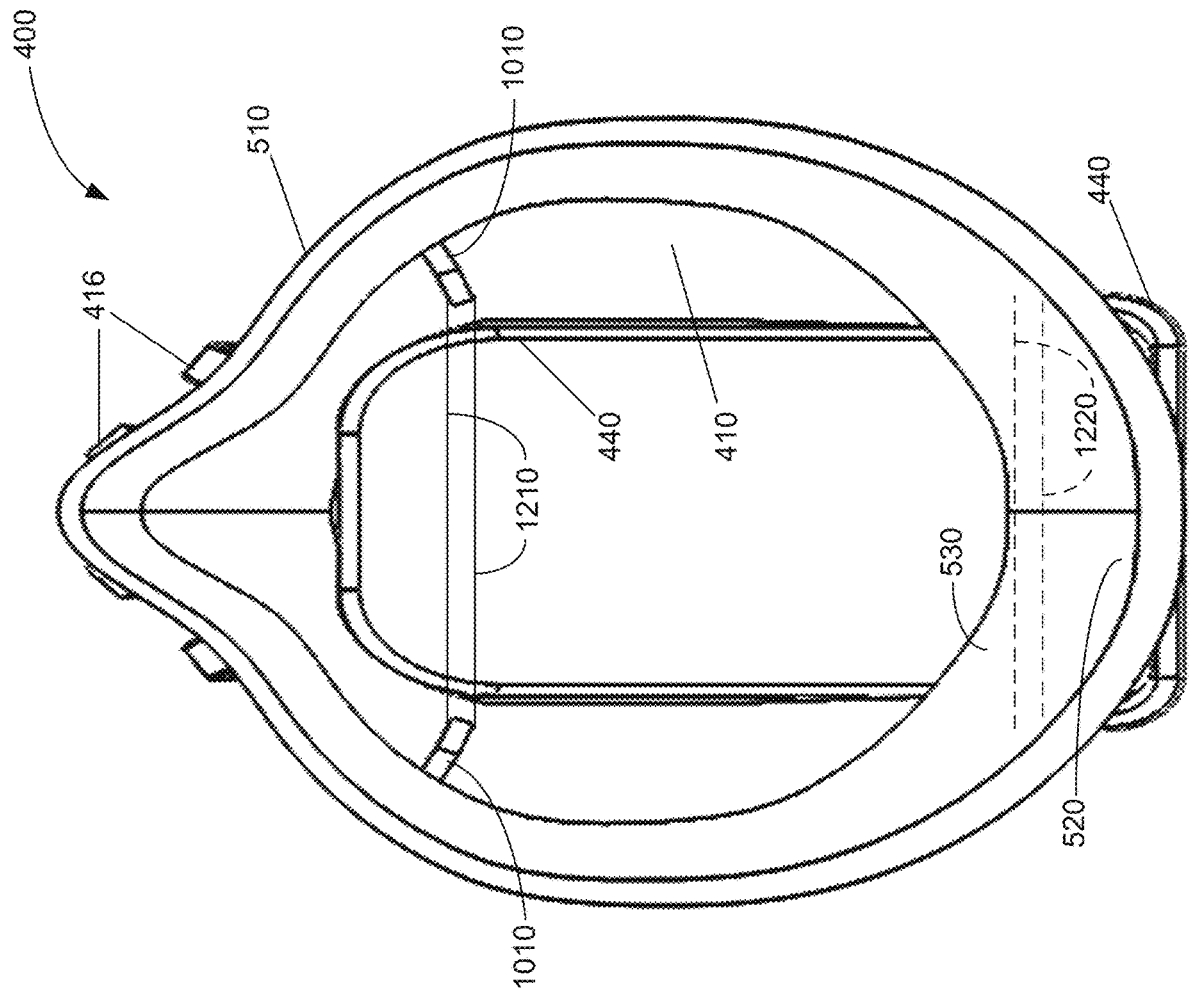
FIG. 12 illustrates a rear elevational view of the respirator body of the respirator of FIG. 10 which is shaped with shaping links.

FIG. 12 illustrates a rear elevational view of the respirator body of the respirator of FIG. 10 which is shaped with shaping links. The compliant outer shell 410 is shaped by adjusting the upper distance between the pair of upper internal anchors 1010 using an upper shaping link 1210 and/or adjusting the lower distance between the pair of lower internal anchors 1110 (see FIG. 11) using a lower shaping link 1220 (shown in broken lines behind the inner shell 520, 530, based on the wearer's facial profile. Preshaping can be done based on a known facial profile of the wearer. Reshaping can be done through trial and error on the wearer's face. The mask straps for attaching the pair of strap attachments or holders 414 to the wearer's head can also contribute to shaping of the outer shell 410. A better fit ensures the effectiveness of protecting the wearer and a more comfortable fit on the wearer's face. The reshaping in FIG. 12 is exaggerated for illustrative purposes.

Enlarged Filter Housing with Modular Filter Compartments

Figure 13:
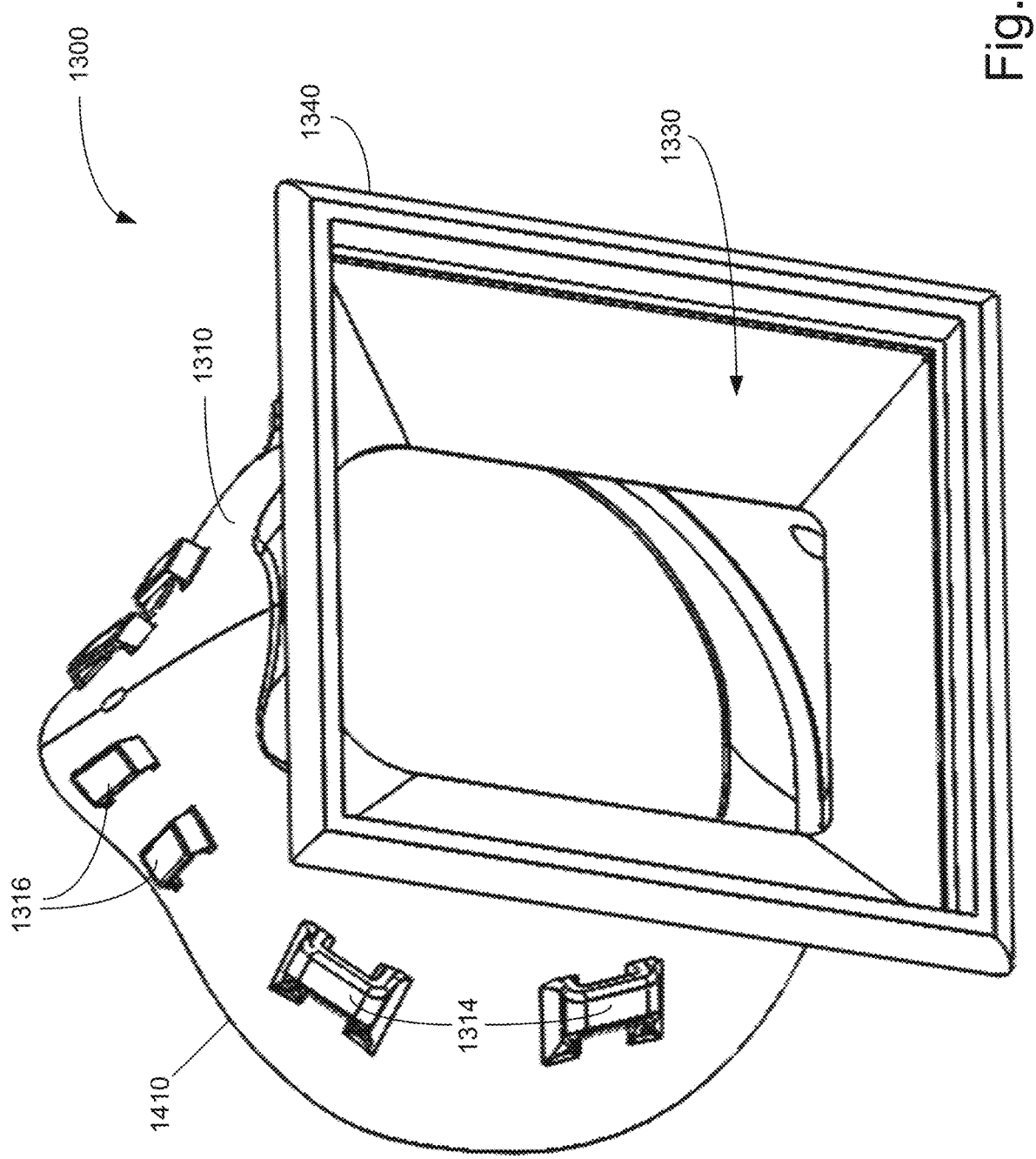
FIG. 13 is a perspective view of the respirator body of a respirator with an enlarged filter housing according to another embodiment of the invention.
Figure 14:
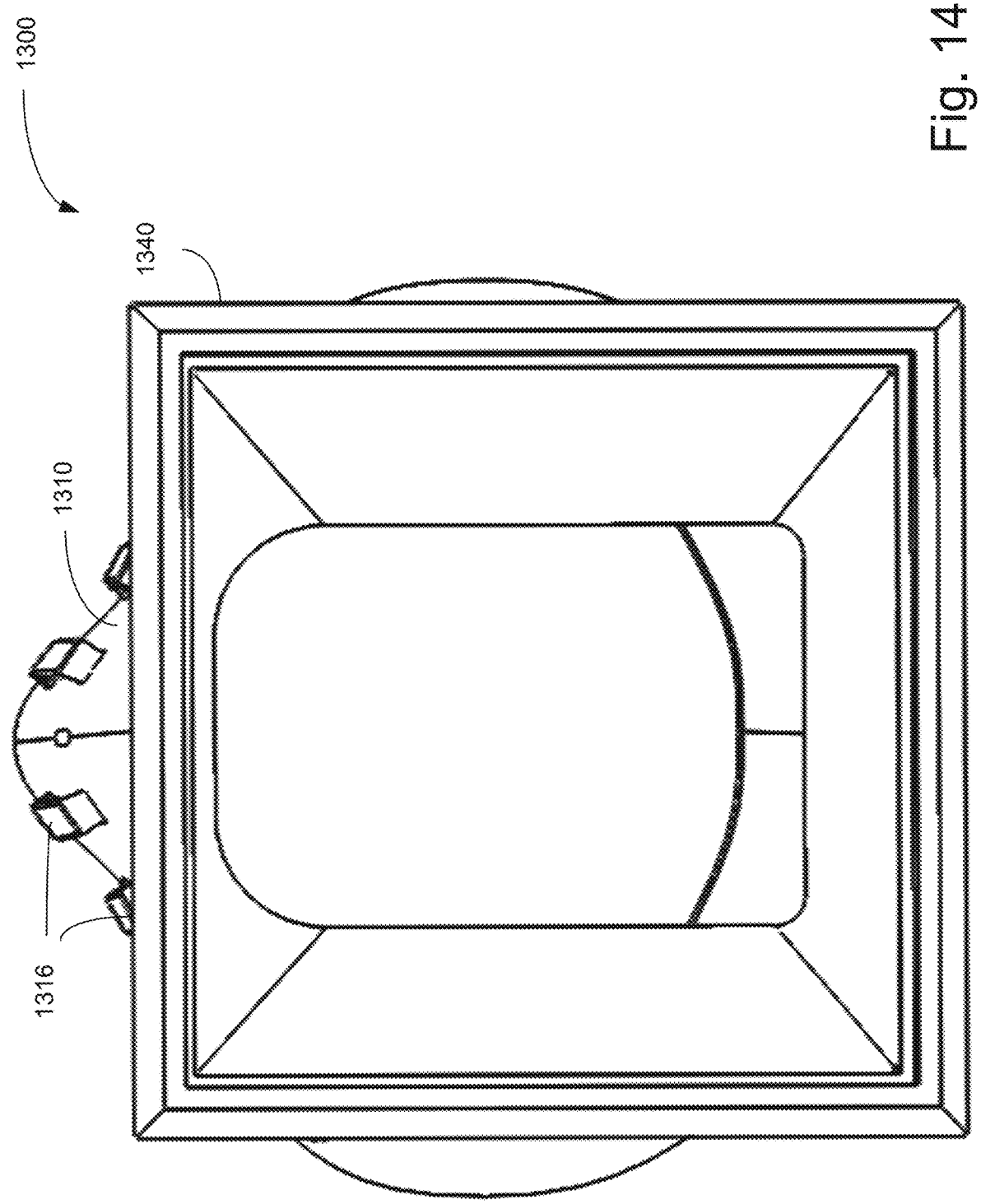
FIG. 14 is a front elevational view of the respirator body of FIG. 13.
Figure 15:
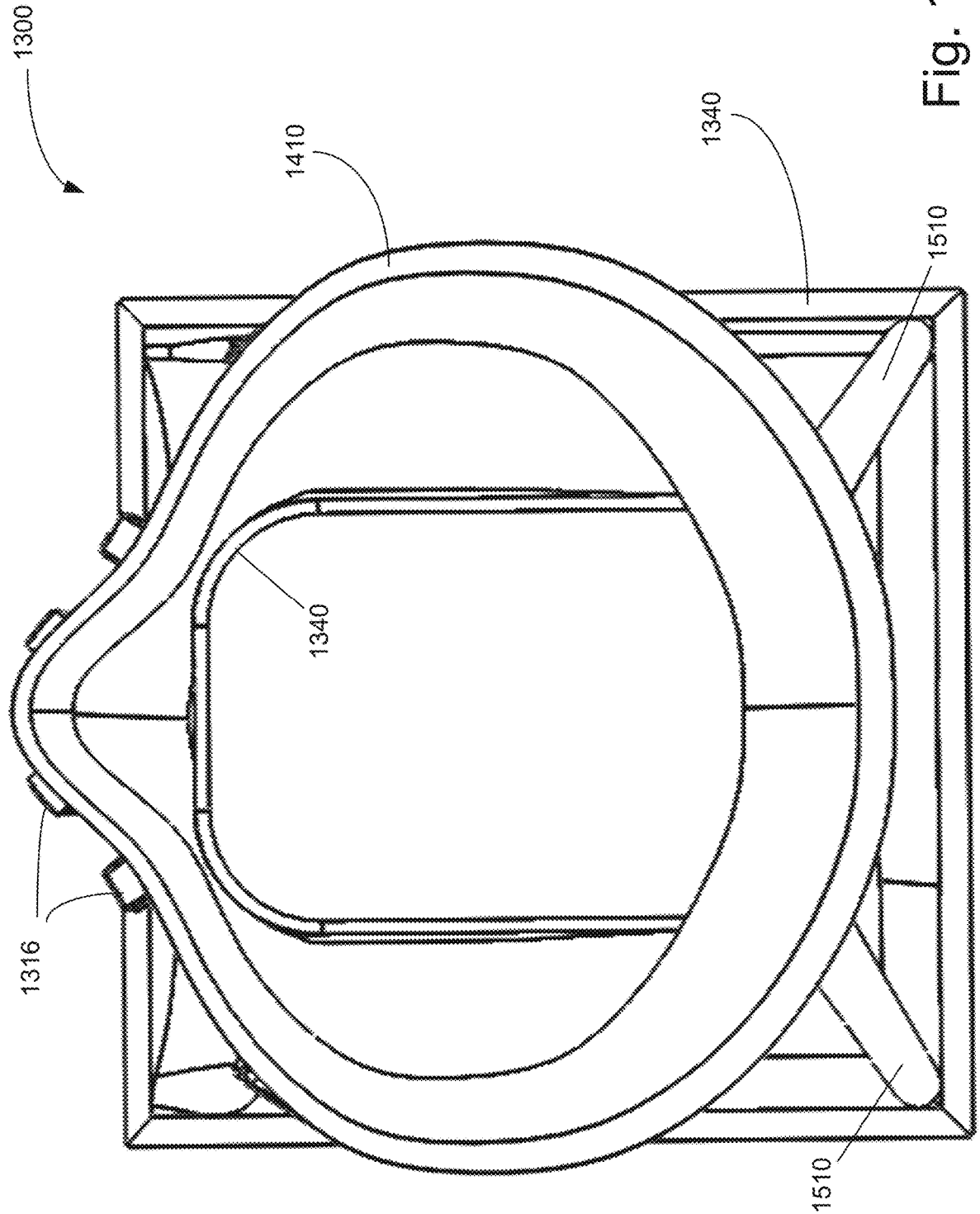
FIG. 15 is a rear elevational view of the respirator body of FIG. 13.
Figure 16:
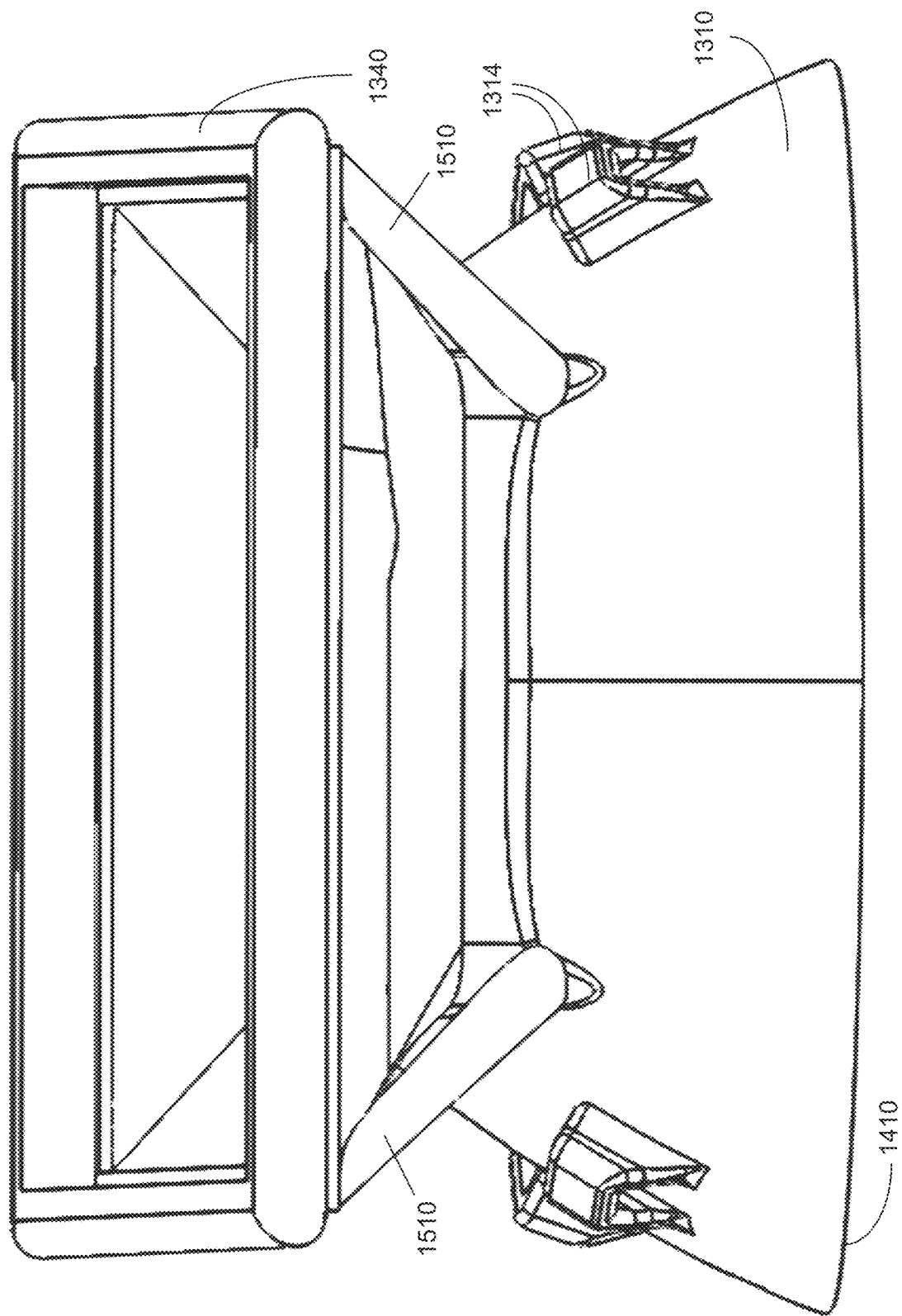
FIG. 16 is a bottom view of the respirator body of FIG. 13.
Figure 17:
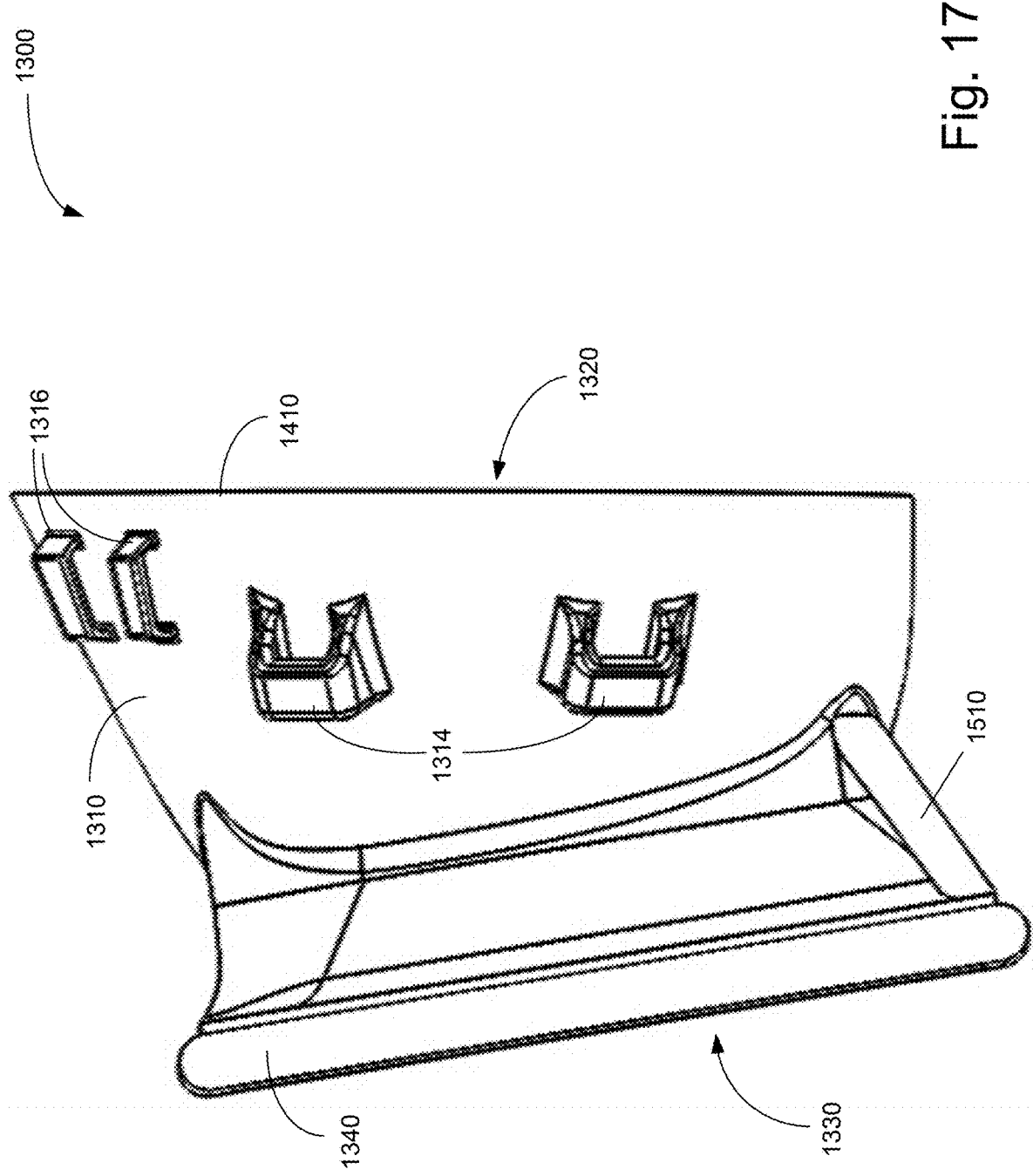
FIG. 17 is a side elevational view of the respirator body of FIG. 13.

FIG. 13 is a perspective view of the respirator body 1300 of a respirator with an enlarged filter housing according to another embodiment of the invention. FIG. 14 is a front elevational view of the respirator body. FIG. 15 is a rear elevational view thereof. FIG. 16 is a bottom view thereof. FIG. 17 is a side elevational view thereof.

The respirator includes a respirator body 1300 which has an outer shell 1310 with a pair of strap attachments or holders 1314 on left and right sides for attaching mask straps and a pair of nose clip slots or retainer brackets 1316 at the top for receiving a nose clip. The respirator body 1300 has a back portion or proximal portion 1320 on a proximal side of the body 1300 and a front portion or distal portion 1330 on a distal side of the body 1300. The distal portion 1330 includes a filter housing wall 1340 and an open distal end. The distal portion 1330 provides a filter box or housing and the proximal portion 1320 provides a facepiece. The outer shell 1310 of the respirator body 1300 includes a proximal end periphery 1410 which forms the proximal end of the facial interface. Two cylindrical supports 1510 are seen in FIGS. 15-19 and are 3D-printed in to allow for the rather extreme overhang to print successfully. Such TPU supports in 3D printing can be difficult to remove; they may be left in place or they can be cut.

Figure 18:
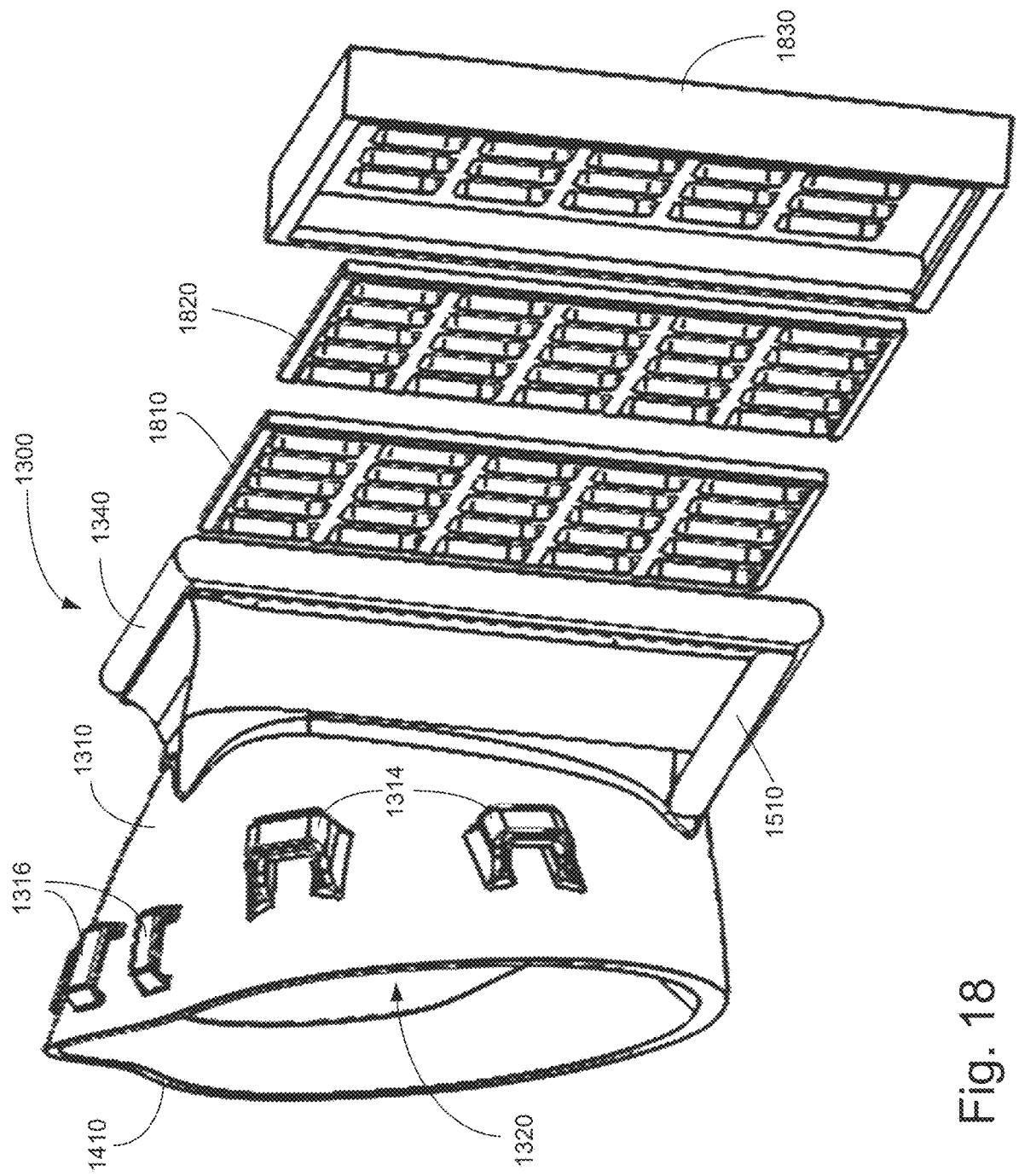
FIG. 18 is an exploded rear perspective view of the respirator with the enlarged filter housing of FIG. 13.
Figure 19:
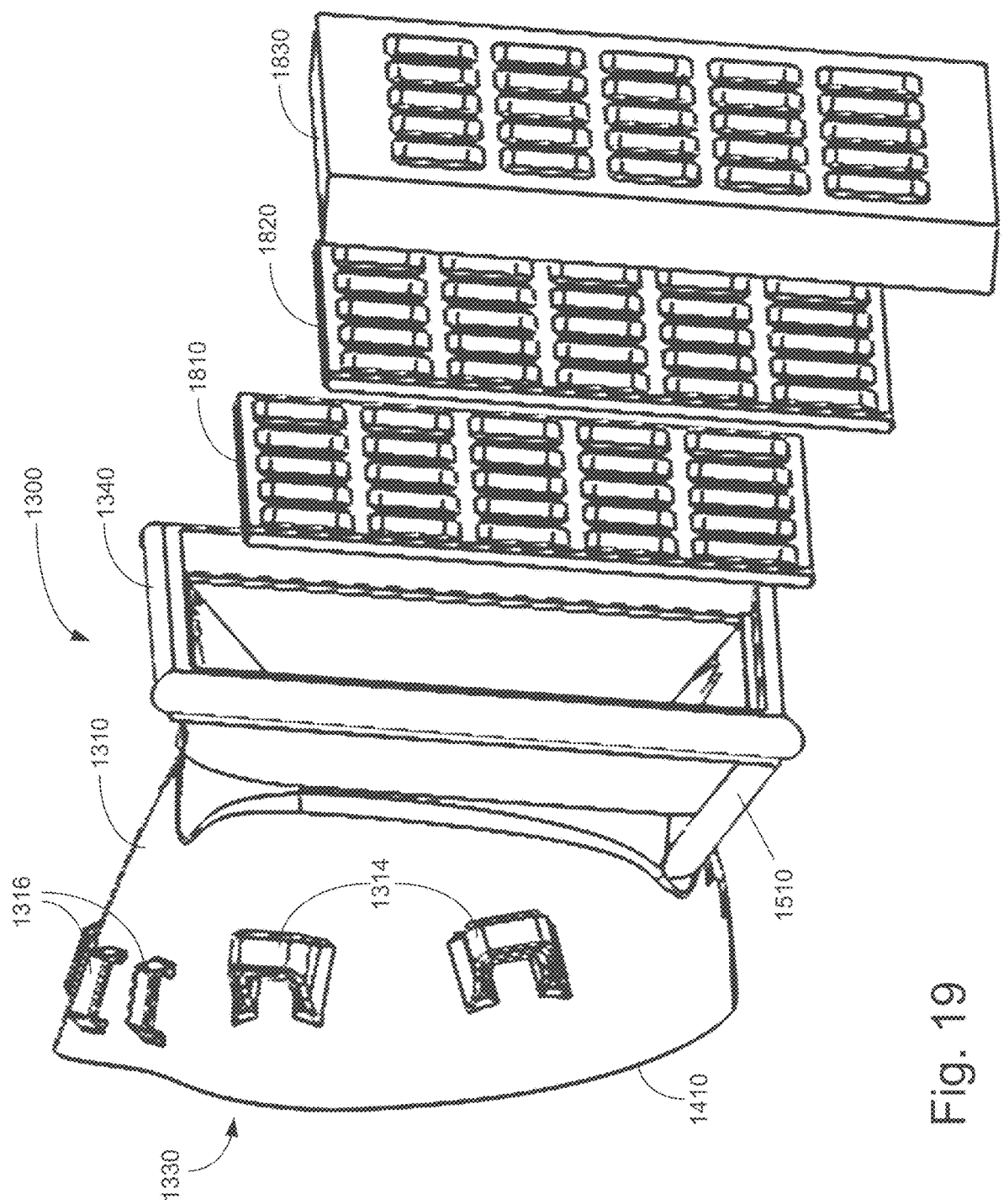
FIG. 19 is an exploded front perspective view of the respirator of FIG. 18.

FIG. 18 is an exploded rear perspective view of the respirator with the enlarged filter housing of FIG. 13. FIG. 19 is an exploded front perspective view of the respirator of FIG. 18. One or more filter frames are configured to be inserted into the distal portion 1330 and be supported by the filter housing wall 1340 to separate filter media on opposite sides of each filter frame. FIGS. 18 and 19 show a first filter frame 1810 and a second filter frame 1820. A filter cover 1830 is configured to be releasably attached to the open distal end of the respirator body 1310 to enclose the filter frames 1810, 1820 and filter media, forming a filter housing.

Figure 21:
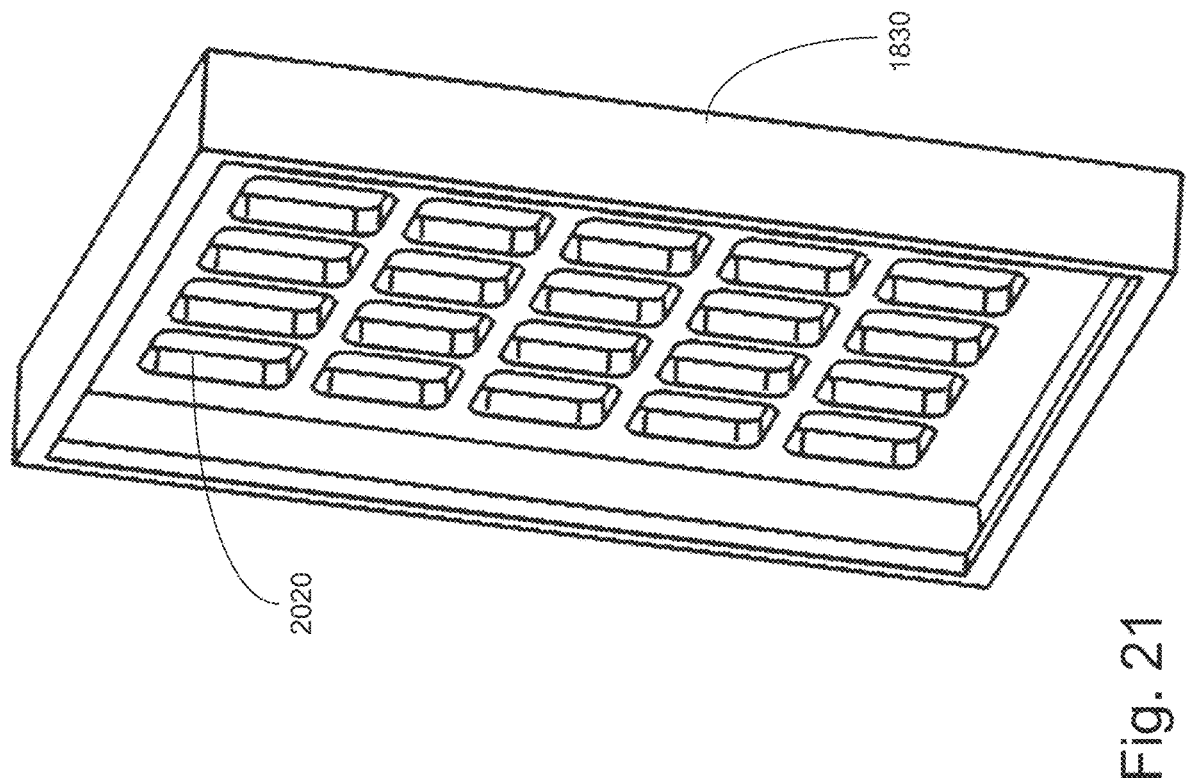
FIG. 21 is a rear perspective view of an enlarged filter cover of the respirator of FIG. 18.
Figure 20:
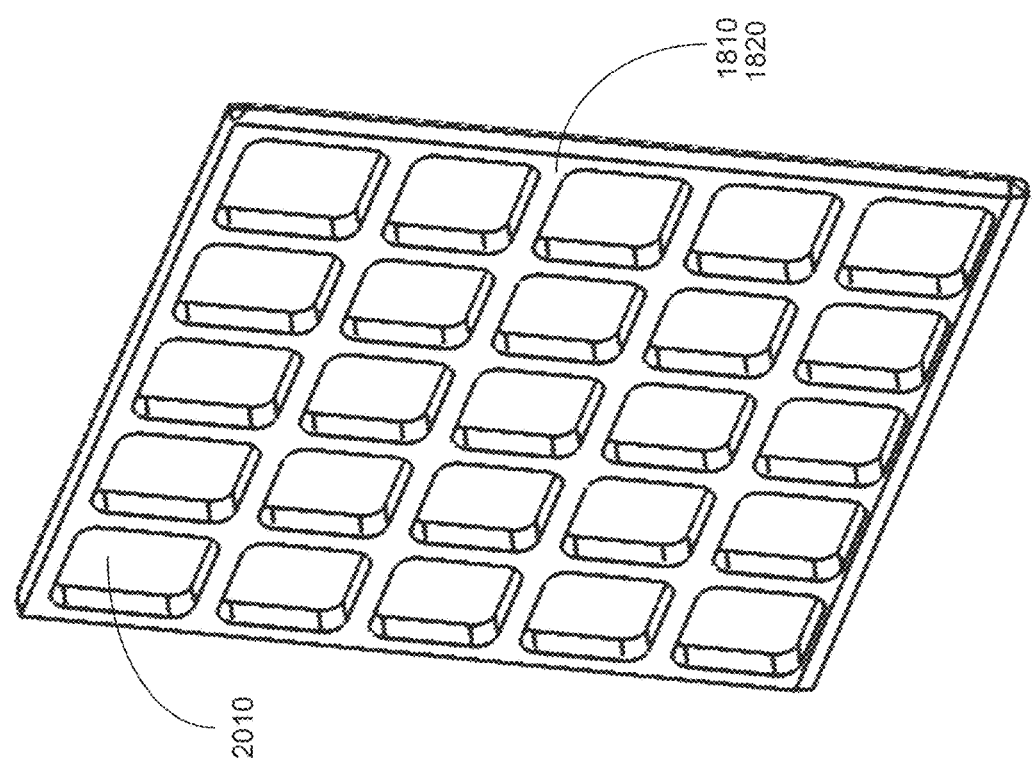
FIG. 20 is a rear perspective view of an enlarged filter frame of the respirator of FIG. 18.

FIG. 20 is a rear perspective view of an enlarged filter frame of the respirator of FIG. 18. FIG. 21 is a rear perspective view of an enlarged filter cover of the respirator of FIG. 18. The filter frames 1810, 1820 each having openings 2010 and the filter cover 1830 has openings 2020 formed by transverse beams or cross beams. The openings of the frames and cover may be aligned in the longitudinal direction extending between the proximal side and the distal side. The openings 2010, 2020 may be about 10 cm×10 cm in size. The filter frames 1810, 1820 are removable from the filter housing at the distal portion 1330 and replaced into the filter housing to allow replacement of the filter media. The filter housing removably secures a plurality of removable filter media. The plurality of filter frames are disposed in the filter housing to provide a plurality of modular filter compartments to place one or more types of filter media.

The enlarged filter housing having enlarged filter frames 1810, 1820 and cover 1830 is provided to increase the potential materials that may be used to meet the N95 goal. The filter housing sizes can span the whole spectrum from the smaller filter housing sizes (FIGS. 1-12) to the larger filter housing size (FIGS. 13-21). An additional feature of the enlarged filter housing design is the built-in permanent support provided by the enlarged filter housing wall 1340 to allow the outer shell 1310 to print at an angle with respect to the filter housing wall 1340. In specific examples, the smaller filter housing wall 140 (FIGS. 1-3B) and 440 (FIGS. 4A-12) each include a second circumference having a second circumference dimension that is smaller than a first circumference dimension of a corresponding first circumference of each of the proximal end periphery 210 (FIGS. 1-3B) and proximal end periphery 510 (FIGS. 4A-12), while the enlarged filter housing wall 1340 (FIGS. 13-19) includes a second circumference having a second circumference dimension that is larger than a first circumference dimension of a first circumference of the proximal end periphery 1410.

Alternatively or additionally, the smaller filter housing wall 140 (FIGS. 1-3B) and 440 (FIGS. 4A-12) each have a second circumference surrounding a second planar area that is smaller than a corresponding first planar area surrounded by a corresponding first circumference of each of the proximal end periphery 210 (FIGS. 1-3B) and proximal end periphery 510 (FIGS. 4A-12), while the enlarged filter housing wall 1340 (FIGS. 13-19) has a second circumference surrounding a second area that is larger than a first planar area surrounded by a first circumference of the proximal end periphery 1410.

3D Printing Manufacturing

The proximal end periphery 510 of the respirator body 400 has a flat shape at the proximal end and lies on a plane in the undeformed state of the proximal portion 420 (to mimic a commercial disposable N95 respirator). The inner shell facial interface 520, 530 forms a contact footprint or a combined gasket on the inner back to accommodate a person's face similar to commercial flexible non-disposable masks on the market. The distal end of the respirator body 400 also has a flat shape. In the embodiment of FIGS. 4A-9B, the proximal end and the distal end form nonparallel planes relative to one another, as best seen in FIG. 6B (as opposed to parallel planes formed by the proximal end and the distal end in the embodiment of FIGS. 1-3B, as best seen in FIG. 3B) and the angle formed may be about 2-20 degrees (e.g., about 10°).

In specific embodiments, the compliance of the respirator body (110 or 410), especially the inner shell (220 and 230 or 520 and 530), is achieved through flexible 3D print media, using TPU (thermoplastic polyurethane) or other compliant materials (e.g., printable non-woven fabrics such as those used in commercial masks). It may also accommodate less compliant materials such as PLA/PETG, or dual material forms (multi-material layers), or even metals for use in injection molding forms as an injection mold to make plastic respirators or the like. Commercially easy materials which have been backed up by data and similar materials which may become available with testing may be used. The respirator may be disinfected through boiling and/or the use of an autoclave. The use of TPU provides the respirator body with flexibility and allows it to be disinfected by boiling in a pressure cooker or pressurized heating in an autoclave.

The design has been tested with 3 internal filter layers separated by the filter frames 450, 460 and with an external filter layer easily added in front of the filter cover 470. It does not require an epoxy, caulking, or other sealer, but the filter layers are simply pressed together. It also provides a superior integrated 3D printed gasket (510, 520, 530) that makes a secure seal with the wearer's face. It prints without support on most Fused Deposition Modelling 3D printers as well as SLA (stereolithography) and other technologies. It is scalable for different size faces and variations have been produced to accommodate additional eyeglass designs and to improve field of view. If filter separation is not required, multiple layers can be stacked between the outermost filter frame and the filter cover. The filter cover may be slipped over the multiple layers or it may be left off and the filter material may be held in place by other means such as a rubber/hair band.

The respirator body 400 and components (450, 460, 470) may each be made using 3D printing, also known as additive manufacturing, in a single or one-step process, using a single material or multiple materials (e.g., the inner contoured shell (520, 530) may have inner shell material and/or thickness, which are different from outer shell material and/or thickness of the outer shell and which render the inner shell more compliant than the outer shell of the respirator body 400).

The inventive concepts taught by way of the examples discussed above are amenable to modification, rearrangement, and embodiment in several ways. For example, the embodiment in FIGS. 1-3B shows filter housing wall 140 having a cylindrical interior surface in a longitudinal direction and filter frames 150, 160 having the same lateral shape conforming to the cylindrical interior of the filter housing wall 140 and the same lateral dimensions transverse to (e.g., perpendicular to) the longitudinal direction. In a different embodiment, the filter housing wall may have an interior surface that increases in size in the distal direction and the filter frames may increase in lateral dimensions in the distal direction to match the increasing size of the interior surface of the filter housing wall in the distal direction. Furthermore, in some embodiments, the distal portion may extend inwardly into the outer shell of the respirator body in the proximal direction instead of outwardly in the distal direction.

Moreover, as best seen in FIGS. 3B and 6B, the first portion 220 or 520 extends from the proximal end periphery 210 or 510 inwardly into the interior of the outer shell 110 or 410 in the distal direction and the second portion 230 or 530 extends from the first portion 220 520 inwardly into the interior of the outer shell in the distal direction, the second portion 230 or 530 being shallower in contour with respect to the distal direction than the first portion 220 or 520. In another embodiment, the first portion may be shallower in contour with respect to the distal direction than the second portion.

Accordingly, although the present disclosure has been described with reference to specific embodiments and examples, persons skilled in the art will recognize that changes may be made in form and detail without departing from the spirit and scope of the disclosure.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A respirator comprising:
a respirator body having a distal portion and a proximal portion, the distal portion including a filter housing wall and an open distal end, the proximal portion including a facial interface which is compliant and deformable from an undeformed state to a deformed state to conform to a facial contour of an individual;
one or more filter frames configured to be inserted into the distal portion and be supported by the filter housing wall to separate one or more filter media on opposite sides of at least one of the one or more filter frames;
a filter cover configured to be releasably attached to the open distal end to enclose the one or more filter frames and the one or more filter media, forming a filter housing; and
a first shaping string;
the one or more filter frames being removable from the distal portion and replaced into the distal portion to allow replacement of the one or more filter media;
the respirator body comprising an outer shell having a proximal end periphery;
the facial interface comprising an inner shell that extends from the proximal end periphery inwardly into an interior of the outer shell in a distal direction;
the outer shell being compliant and including a first pair of left and right internal anchors in the interior of the outer shell, on left and right sides of the outer shell, distal of the inner shell and proximal of the filter housing; and
the first string being connected with the first pair of left and right internal anchors in the interior of the outer shell and configured to change in length between the first pair of left and right internal anchors to adjust a distance between the first pair of left and right internal anchors from an undeformed shape to deform and shape the outer shell.

2. The respirator of claim 1,
wherein the inner shell of the facial interface is an inner contoured shell which is compliant and deformable from the undeformed state to the deformed state to conform to the facial contour of the individual.

3. The respirator of claim 2, wherein the inner contoured shell comprises an inner shell material and an inner shell thickness which render the inner contoured shell more compliant than the outer shell with an outer shell material and an outer shell thickness.

4. The respirator of claim 2, wherein:
the inner contoured shell comprises:
a first portion extending from the proximal end periphery inwardly into the interior of the outer shell in the distal direction and
a second portion extending from the first portion inwardly into the interior of the outer shell in the distal direction, and
the second portion is shallower in contour, with respect to the distal direction, than the first portion.

5. The respirator of claim 1, wherein:
the outer shell includes a second pair of left and right internal anchors in the interior of the outer shell, on the left and right sides of the outer shell, distal of the inner shell and proximal of the filter housing, to be connected to the first shaping string which is configured to change in length between the second pair of left and right internal anchors to adjust a distance between the second pair of left and right internal anchors to deform and shape the outer shell; and the first pair of left and right internal anchors are disposed on an upper part of the outer shell and the second pair of left and right internal anchors are disposed on a lower part of the outer shell.

6. The respirator of claim 1, further comprising a second shaping string, wherein:
the outer shell includes a second pair of left and right internal anchors in the interior of the outer shell, on the left and right sides of the outer shell, distal of the inner shell and proximal of the filter housing, to be connected to the second shaping string which is configured to change in length between the second pair of left and right internal anchors to adjust a distance between the second pair of left and right internal anchors to deform and shape the outer shell; and
the first pair of left and right internal anchors are disposed on an upper part of the outer shell and the second pair of left and right internal anchors are disposed on a lower part of the outer shell.

7. The respirator of claim 1, wherein:
the filter frames are disposed in the filter housing to provide a plurality of compartments to place one or more types of filter media;
the filter housing wall has an interior surface; and
the filter frames have outer shapes conforming to the interior surface of the filter housing wall.

8. The respirator of claim 1, wherein the filter housing is tilted in a downward angle with respect to the proximal portion of the respirator body.

9. A respirator comprising:
a respirator body having a distal portion and a proximal portion and a first shaping string, the distal portion including a filter housing, the proximal portion including a facial interface which is compliant and deformable from an undeformed state to a deformed state to conform to a facial contour of an individual;
the respirator body including an outer shell having a proximal end periphery; and
the facial interface including an inner shell that extends from the proximal end periphery inwardly into an interior of the outer shell in a distal direction, the inner shell being compliant and deformable from the undeformed state to the deformed state to conform to the facial contour of the individual; and
the outer shell being compliant and including a first pair of left and right internal anchors in the interior of the outer shell, on left and right sides of the outer shell, distal of the inner shell and proximal of the filter housing, to receive the first shaping string which is configured to change in length between the first pair of left and right internal anchors to adjust a distance between the first pair of left and right internal anchors from an undeformed shape to deform and shape the outer shell.

10. The respirator of claim 9, wherein the inner shell comprises an inner shell material and an inner shell thickness which render the inner shell more compliant than the outer shell with an outer shell material and an outer shell thickness.

11. The respirator of claim 9, wherein the inner shell comprises a first portion extending from the proximal end periphery inwardly into the interior of the outer shell in the distal direction and a second portion extending from the first portion inwardly into the interior of the outer shell in the distal direction, the second portion being shallower in contour, with respect to the distal direction, than the first portion.

12. The respirator of claim 9, wherein the proximal end periphery lies on a plane in the undeformed state of the proximal portion.

13. The respirator of claim 9, wherein:
the outer shell includes a second pair of left and right internal anchors in the interior of the outer shell, on the left and right sides of the outer shell, distal of the inner shell and proximal of the filter housing, to receive the first shaping string which is configured to change in length between the second pair of left and right internal anchors to adjust a distance between the second pair of left and right internal anchors to deform and shape the outer shell; and
the first pair of left and right internal anchors are disposed on an upper part of the outer shell and the second pair of left and right internal anchors are disposed on a lower part of the outer shell.

14. The respirator of claim 9, further comprising a second shaping string, wherein:
the outer shell includes a second pair of left and right internal anchors in the interior of the outer shell, on the left and right sides of the outer shell, distal of the inner shell and proximal of the filter housing, to receive the second shaping string which is configured to change in length between the second pair of left and right internal anchors to adjust a distance between the second pair of left and right internal anchors to deform and shape the outer shell; and
the first pair of left and right internal anchors are disposed on an upper part of the outer shell and the second pair of left and right internal anchors are disposed on a lower part of the outer shell.

15. The respirator of claim 9, wherein the filter housing comprises a filter housing wall extending from the outer shell to an open distal end at the distal portion and a filter cover configured to be releasably attached to the open distal end to enclose the filter housing, the respirator further comprising:
one or more filter frames configured to be inserted into the filter housing via the open distal end and be supported by the filter housing wall to separate one or more filter media on opposite sides of at least one of the one or more filter frames inside the filter housing, the one or more filter frames being removable from the filter housing and replaced into the filter housing to allow replacement of the one or more filter media.

16. The respirator of claim 15, wherein a plurality of filter frames are disposed in the filter housing to provide a plurality of compartments, the respirator further comprising:
multiple types of the filter media disposed in the plurality of compartments.

17. A respirator comprising:
a respirator body having a distal portion and a proximal portion and a first shaping link, the distal portion including a filter housing wall extending in a longitudinal direction to an open distal end to house one or more filter media, the proximal portion including a facial interface which is compliant and deformable from an undeformed state to a deformed state to conform to a facial contour of an individual;
the respirator body including an outer shell having a proximal end periphery;
the outer shell being compliant and including a first pair of left and right internal anchors in an interior of the outer shell, on left and right sides of the outer shell, distal of the proximal end periphery and proximal of the filter housing wall, to receive the first shaping link which is configured to change in length between the first pair of left and right internal anchors to adjust a distance between the first pair of left and right internal anchors from an undeformed shape to deform and shape the outer shell.

18. The respirator of claim 17, further comprising a second shaping link, wherein:

the outer shell includes a second pair of left and right internal anchors in the interior of the outer shell, on the left and right sides of the outer shell, distal of the proximal end periphery and proximal of the filter housing wall, to receive the second shaping link which is configured to change in length between the second pair of left and right internal anchors to adjust a distance between the second pair of left and right internal anchors to deform and shape the outer shell; and the first pair of left and right internal anchors are disposed on an upper part of the outer shell and the second pair of left and right internal anchors are disposed on a lower part of the outer shell.

19. The respirator of claim 17, wherein:

the facial interface includes an inner shell that extends from the proximal end periphery inwardly into the interior of the outer shell in a distal direction, the inner shell being compliant and deformable from the undeformed state to the deformed state to conform to the facial contour of the individual; and the first pair of left and right internal anchors are distal of the inner shell.

20. The respirator of claim 19, wherein the inner shell comprises a first portion extending from the proximal end periphery inwardly into the interior of the outer shell in the distal direction and a second portion extending from the first portion inwardly into the interior of the outer shell in the distal direction, the second portion being shallower in contour, with respect to the distal direction, than the first portion.

21. The respirator of claim 17, wherein:

the outer shell includes a second pair of left and right internal anchors in the interior of the outer shell, on the left and right sides of the outer shell, distal of the inner shell and proximal of the filter housing wall, to receive the first shaping link which is configured to change in length between the second pair of left and right internal anchors to adjust a distance between the second pair of left and right internal anchors to deform and shape the outer shell; and the first pair of left and right internal anchors are disposed on an upper part of the outer shell and the second pair of left and right internal anchors are disposed on a lower part of the outer shell.

\* \* \* \* \*